(12) United States Patent
Ono

(10) Patent No.: US 12,139,196 B2
(45) Date of Patent: Nov. 12, 2024

(54) CONTROL APPARATUS, STEERING DEVICE, AND CONTROL METHOD

(71) Applicant: TOYOTA JIDOSHA KABUSHIKI KAISHA, Toyota (JP)

(72) Inventor: Kimiaki Ono, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 18/086,087

(22) Filed: Dec. 21, 2022

(65) Prior Publication Data
US 2023/0278630 A1 Sep. 7, 2023

(30) Foreign Application Priority Data
Mar. 2, 2022 (JP) ................. 2022-031927

(51) Int. Cl.
*B62D 15/02* (2006.01)
*B62D 5/04* (2006.01)

(52) U.S. Cl.
CPC ......... *B62D 15/025* (2013.01); *B62D 5/0463* (2013.01)

(58) Field of Classification Search
CPC .............. B62D 15/025; B62D 5/0463
See application file for complete search history.

(56) References Cited

U.S. PATENT DOCUMENTS

| 12,024,241 | B2* | 7/2024 | Aoki | B62D 15/025 |
| 2005/0267661 | A1 | 12/2005 | Iwazaki et al. | |
| 2018/0065657 | A1 | 3/2018 | Hirate et al. | |
| 2018/0118253 | A1* | 5/2018 | Minamiguchi | B62D 5/0472 |
| 2021/0061344 | A1* | 3/2021 | Kitazume | B62D 1/286 |

FOREIGN PATENT DOCUMENTS

| JP | 2005-343184 A | 12/2005 |
| JP | 2013-063778 A | 4/2013 |
| JP | 2016-107750 A | 6/2016 |
| JP | 2018-030481 A | 3/2018 |

\* cited by examiner

Primary Examiner — George C Jin
(74) Attorney, Agent, or Firm — Sughrue Mion, PLLC

(57) ABSTRACT

A control apparatus according to the present disclosure is configured to perform a process of calculating a command torque that is given to a steering mechanism, an adjustment gain calculation process in which an adjustment gain for the command torque is calculated based on a steering torque, a process of calculating an adjusted command torque obtained by applying the adjustment gain to the command torque, and a process of controlling the steering mechanism in accordance with the adjusted command torque. It should be noted herein that the adjustment gain calculation process includes a process of calculating an adjusted steering torque having predetermined hysteresis characteristics with respect to changes in the steering torque, based on the steering torque, and a process of converting the adjusted steering torque into the adjustment gain.

8 Claims, 12 Drawing Sheets

CONTROL APPARATUS, STEERING DEVICE, AND CONTROL METHOD

CROSS-REFERENCE TO RELATED APPLICATION

This application claims priority to Japanese Patent Application No. 2022-031927 filed on Mar. 2, 2022, incorporated herein by reference in its entirety.

BACKGROUND

1. Technical Field

The present disclosure relates to an art of controlling a steering mechanism of a vehicle. In particular, the present disclosure relates to an art of controlling a steering mechanism to cause a vehicle to follow a target trajectory.

2. Description of Related Art

In Japanese Unexamined Patent Application Publication No. 2018-030481 (JP 2018-030481 A), there is disclosed a steering control apparatus equipped with a state determination unit that is configured to determine, from a steering torque and a motor angular velocity, at least whether a steering state is a state of steering normally or a state of steering back, an interference detection unit that calculates an interference coefficient for the steering torque through the use of conversion characteristics that are changed in accordance with the steering state, and an internal value computation unit that changes the ratio between an automatic steering torque and an assist torque in accordance with the interference coefficient.

SUMMARY

In recent years, the function of causing a vehicle to follow a target trajectory (hereinafter referred to also as "the follow-up steering function") has been conceived as a function of driving support or automated driving. In the follow-up steering function, the steering mechanism is controlled such that the vehicle follows the target trajectory. In general, the torque given to the steering mechanism is controlled in controlling the steering mechanism.

On the other hand, when the follow-up steering function is on, a driver of the vehicle may desire to steer the vehicle in a direction different from the target trajectory. In this case, the driver operates a driving operation device such as a steering wheel such that the vehicle is steered in the desired direction. At this time, the driver is required to generate a steering torque through the operation of the driving operation device, against the torque given through the follow-up steering function. In general, therefore, the torque given through the follow-up steering function is adjusted in accordance with the steering torque.

It should be noted herein that the driving feeling developed by the driver differs depending on whether the driver attempts to generate the steering torque in the direction opposite to the direction of the torque given through the follow-up steering function or in the same direction as the direction of the torque. Therefore, the driver may develop an extreme driving feeling when the driver's steering state with respect to the target trajectory is a certain state. The controllability of the vehicle by the driver may hence be reduced.

In JP 2018-030481 A, there is disclosed an art of determining whether the driver's steering state is steering fixedly, steering normally, steering back, or steering in a hands-free state, and calculating the interference coefficient through the use of the conversion characteristics that are changed in accordance with the steering state. It is disclosed that the conversion characteristics are given such that the degree of interference by follow-up control becomes small, especially when the steering state is steering back.

However, in the art disclosed in JP 2018-030481 A, there may be scenes in which the controllability of the vehicle by the driver cannot be sufficiently enhanced when the driver's steering state with respect to the target trajectory is a certain state. For example, when the driver attempts to slightly modify the trajectory of the vehicle, the adjustment gain needs to be changed within such a range that changes in state quantity are small. As a result, the enhancement of the performance of following the target trajectory and the enhancement of the controllability of the vehicle by the driver may become incompatible with each other.

In view of the foregoing problem, it is an object of the present disclosure to provide an art that makes it possible to enhance the controllability of a vehicle by a driver in accordance with a steering state with respect to a target trajectory, in the case where the driver attempts to steer the vehicle when a follow-up steering function is on.

The first disclosure relates to a control apparatus for a vehicle.

The control apparatus according to the first disclosure is configured to perform a process of calculating a command torque that is given to a steering mechanism to cause the vehicle to follow a target trajectory, an adjustment gain calculation process in which an adjustment gain for the command torque is calculated based on a steering torque, an adjusted command torque calculation process in which an adjusted command torque obtained by applying the adjustment gain to the command torque is calculated, and a process of controlling the steering mechanism in accordance with the adjusted command torque. It should be noted herein that the adjustment gain calculation process includes a first process in which an adjusted steering torque having predetermined hysteresis characteristics with respect to changes in the steering torque is calculated based on the steering torque, and a second process in which the adjusted steering torque is converted into the adjustment gain.

The second disclosure relates to a control apparatus having the following characteristics in addition to those of the control apparatus according to the first disclosure.

The first process includes calculating the adjusted steering torque in a current process in such a direction that an absolute value of a difference between the steering torque and the adjusted steering torque in a last process decreases, on condition that the absolute value be larger than a predetermined torque hysteresis, and calculating the adjusted steering torque in the last process as the adjusted steering torque in the current process, on condition that the absolute value be equal to or smaller than the torque hysteresis.

The third disclosure relates to a control apparatus having the following characteristics in addition to those of the control apparatus according to the second disclosure.

Calculating the adjusted steering torque in the current process in such a direction that the absolute value decreases in the first process includes calculating a value obtained by subtracting the torque hysteresis from the steering torque as the adjusted steering torque in the current process when the steering torque is larger than the adjusted steering torque in the last process, and calculating a value obtained by adding the torque hysteresis to the steering torque as the adjusted steering torque in the current process when the steering torque is smaller than the adjusted steering torque in the last process.

The fourth disclosure relates to a control apparatus having the following characteristics in addition to those of the control apparatus according to the first disclosure.

The first process includes calculating the adjusted steering torque in a current process in such a direction that an absolute value of a difference between the steering torque and the steering torque in a last process decreases when the absolute value is larger than a predetermined torque hysteresis, and calculating the adjusted steering torque in the current process such that adjusted steering torque in the current process changes with a predetermined gradient when the absolute value is equal to or smaller than the torque hysteresis.

The fifth disclosure relates to a control apparatus having the following characteristics in addition to those of the control apparatus according to any one of the second to fourth disclosures.

The adjustment gain calculation process further includes changing the torque hysteresis in accordance with the steering torque.

The sixth disclosure relates to a control apparatus having the following characteristics in addition to those of the control apparatus according to any one of the first to fifth disclosures.

The command torque includes an FF command torque that is a feedforward control amount based on a target state quantity that is designed to cause the vehicle to follow the target trajectory, and an FB command torque that is a feedback control amount based on a difference between the target state quantity and a current state quantity. Besides, the adjustment gain includes a first adjustment gain and a second adjustment gain. Besides, the adjustment gain calculation process includes the first process corresponding to the first adjustment gain or the second process corresponding to the second adjustment gain. Moreover, the adjusted command torque calculation process consists in calculating an adjusted FB command torque obtained by applying the first adjustment gain to the FB command torque, and calculating a value obtained by applying the second adjustment gain to a sum of the FF command torque and the adjusted FB command torque, or a sum of a value obtained by applying the second adjustment gain to the FF command torque and the adjusted FB command torque, as the adjusted command torque.

The seventh disclosure relates to a steering device of a vehicle.

The steering device according to the seventh disclosure is equipped with the control apparatus according to any one of the first to fifth disclosures, and a steering mechanism that is controlled by the control apparatus. It should be noted herein that the steering mechanism is an electric power steering.

The eighth disclosure relates to a control method for a vehicle.

The control method according to the eighth disclosure includes calculating a command torque that is given to a steering mechanism to cause the vehicle to follow a target trajectory, calculating an adjustment gain for the command torque based on a steering torque, calculating an adjusted command torque obtained by applying the adjustment gain to the command torque, and controlling the steering mechanism in accordance with the adjusted command torque. It should be noted herein that calculating the adjustment gain includes calculating an adjusted steering torque having predetermined hysteresis characteristics with respect to changes in the steering torque, based on the steering torque, and converting the adjusted steering torque into the adjustment gain.

The ninth disclosure relates to a storage medium that stores a program regarding the control of a vehicle.

The storage medium according to the ninth disclosure stores a program that is configured to cause a computer to perform a process of calculating a command torque that is given to a steering mechanism to cause the vehicle to follow a target trajectory, an adjustment gain calculation process in which an adjustment gain for the command torque is calculated based on a steering torque, a process of calculating an adjusted command torque obtained by applying the adjustment gain to the command torque, and a process of controlling the steering mechanism in accordance with the adjusted command torque. It should be noted herein that the adjustment gain calculation process includes a process of calculating an adjusted steering torque having predetermined hysteresis characteristics with respect to changes in the steering torque, based on the steering torque, and a process of converting the adjusted steering torque into the adjustment gain.

According to the present disclosure, the adjusted steering torque having the predetermined hysteresis characteristics with respect to changes in the steering torque is calculated. Then, the adjustment gain is calculated through conversion of the calculated adjusted steering torque. Thus, the adjustment gain with characteristics with respect to the steering torque that differ depending on the steering state with respect to the target trajectory can be calculated. Besides, the adjustment gain is maintained for a while when the vehicle is steered reversely. The controllability of the vehicle by the driver can hence be enhanced appropriately in accordance with the steering state with respect to the target trajectory.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The embodiments of the present disclosure will be described hereinafter with reference to the drawings. It should be noted, however, that when the numerical values such as the number, quantity, amount, range of respective elements are mentioned in the following embodiments, the concept according to the present disclosure should not be limited to the numerical values mentioned unless specified otherwise or unless the numerical values are obviously irreplaceable in principle. Besides, the configurations and the like that will be described in the following embodiments are not indispensable to the concept according to the present disclosure unless specified otherwise or unless the configurations and the like are obviously irreplaceable in principle. Incidentally, like or corresponding components or parts are denoted by like reference symbols in the respective drawings, and redundant description thereof will be simplified or omitted as appropriate.

1. FOLLOW-UP STEERING FUNCTION

A control apparatus according to one of the embodiments controls a steering mechanism in such a manner as to cause a vehicle to follow a target trajectory. The control of a steering mechanism 10 by the control apparatus (an ECU 100) will be described with reference to a steering device shown in FIG. 1.

Figure 1:
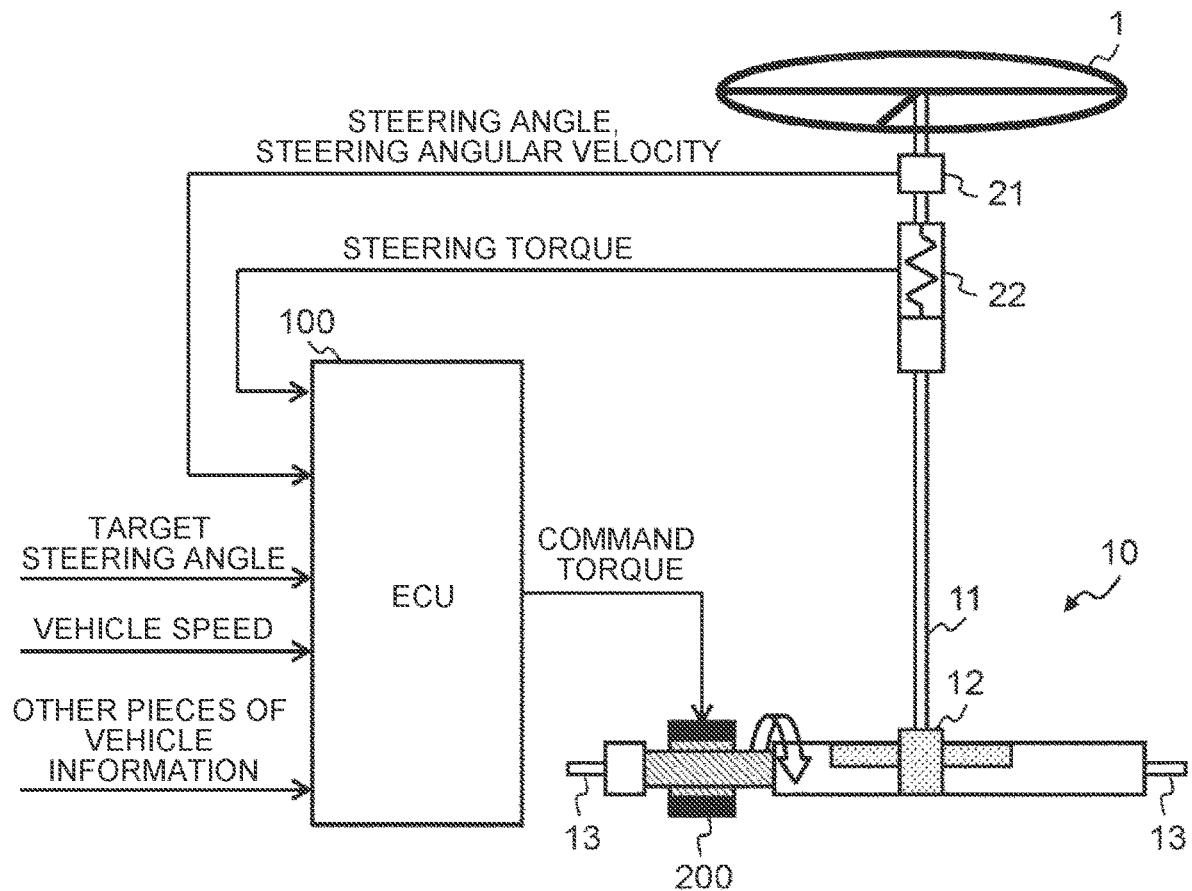
FIG. 1 is a conceptual view for illustrating the control of a steering mechanism by a control apparatus according to one of the embodiments.

In FIG. 1, the common steering mechanism 10 that includes a steering shaft 11, a gearbox 12, and a tie rod 13 is depicted. That is, the steering shaft 11 is connected to the gearbox 12, and rotates as a steering wheel 1 is operated. Then, with the aid of the gearbox 12, the tie rod 13 moves straight in accordance with the rotating motion of the steering shaft 11. Typically, the gearbox 12 has a rack-and-pinion structure, and the tie rod 13 that is connected to a rack moves straight through conversion of the rotating motion of the steering shaft 11 into the straight motion of the rack via a pinion. The steering angle of the vehicle can be changed through the straight motion of the tie rod 13. As a result, the steering of the vehicle is realized.

A motor 200 is attached to the rack region of the steering mechanism 10. The steering mechanism 10 is configured to be able to move the rack straight through the generation of a torque following the motion of the motor 200 as well. That is, the steering mechanism 10 is a rack-assisted electric power steering. It should be noted, however, that the steering mechanism 10 may be a column-assisted or pinion-assisted electric power steering in the present embodiment.

In FIG. 1, the control apparatus is realized as the ECU (electronic control unit) 100. The ECU 100 generates and outputs a control signal by performing a process. In particular, the ECU 100 generates and outputs a command torque for the motor 200 as the control signal. The motor 200 behaves in such a manner as to generate the command torque acquired from the ECU 100, and the control of the steering mechanism by the ECU 100 is thereby realized. For example, inverter control is performed in such a manner as to generate the command torque in the motor 200.

The ECU 100 is configured to acquire a target steering angle (a target state quantity) for causing the vehicle to follow a target trajectory, a vehicle speed, and other pieces of vehicle information. Moreover, the ECU 100 generates and outputs a command torque such that the vehicle is steered at the target steering angle. Thus, a function of causing the vehicle to follow the target trajectory (a follow-up steering function) is realized. It should be noted herein that the target steering angle is typically calculated in an additional ECU that provides the follow-up steering function, and is transmitted to the ECU 100. The follow-up steering function may be one of driving support functions provided by the additional ECU, or part of an automated driving function. Besides, an acceleration, a yaw rate, a current steering angle, specifications of the vehicle, and the like are exemplified as the other pieces of vehicle information. The vehicle speed and the other pieces of vehicle information can be acquired from sensors provided in the vehicle or other ECU's, or may be acquired as data stored in a memory (storage medium).

Furthermore, the ECU 100 may have a function regarding steering stability control. For example, the ECU 100 may be configured to generate an assist torque as a command torque, in accordance with a steering angle or steering angular velocity of the steering wheel 1 or a steering torque resulting from the operation of the steering wheel 1. In this case, the steering angle or steering angular velocity of the steering wheel 1 can be acquired from a steering angle sensor 21. The steering torque resulting from the operation of the steering wheel 1 can be acquired from a torque sensor 22.

The ECU 100 is typically provided in the vehicle. It should be noted, however, that the control apparatus according to the present embodiment may be an apparatus outside the vehicle. For example, the control apparatus according to the present embodiment may be realized as a server that communicates with the vehicle via the Internet. In this case, the control apparatus acquires information through communication, and transmits a control signal.

By the way, when the follow-up steering function is on, a driver of the vehicle may desire to steer the vehicle in a direction different from the target trajectory. For example, it is possible to mention a case where the driver desires to keep a distance from an obstacle ahead when the target trajectory is a straight trajectory, and a case where the driver desires to drive the vehicle with a short turning radius when the target trajectory is a turning trajectory. In this case, the driver operates the steering wheel 1 such that the vehicle is steered in the desired direction. For example, when the driver desires to keep a distance from an obstacle ahead, it is assumed that the driver performs the operation of steering the steering wheel 1 normally in such a manner as to keep a distance from the obstacle, and steering the steering wheel 1 back as soon as there is a certain distance between the vehicle and the obstacle.

When operating the steering wheel 1 in this manner while the follow-up steering function is on, the driver is required to generate a steering torque through the operation of the steering wheel 1, against a torque that is generated by the motor 200 through the follow-up steering function. In general, therefore, the torque that is generated by the motor 200 through the follow-up steering function is adjusted in accordance with the steering torque. That is, the ECU 100 adjusts the command torque in accordance with the steering torque.

Figure 2:
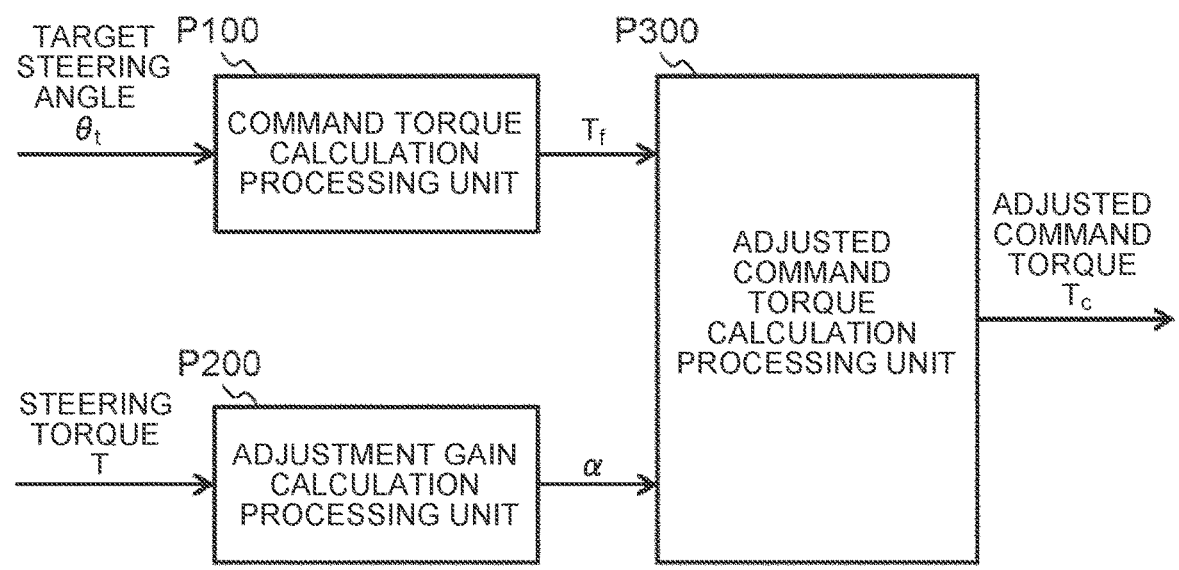
FIG. 2 is a block diagram showing the overall configuration of processes that are performed by an ECU shown in FIG. 1 in the case where a command torque is adjusted in accordance with a steering torque.

FIG. 2 is a block diagram showing the overall configuration of processes that are performed by the ECU 100 in the case where the command torque is adjusted in accordance with the steering torque. In FIG. 2, the processes that are performed by the ECU 100 are configured to be performed by a command torque calculation processing unit P100, an adjustment gain calculation processing unit P200, and an adjusted command torque calculation processing unit P300 respectively. These processing units may be given as a program, or may be realized by separate processors.

The command torque calculation processing unit P100 receives a target steering angle θt, and calculates a command torque Tf such that the vehicle is steered at the target steering angle θt. For example, the command torque Tf is calculated through feedforward control based on the target steering angle θt and feedback control based on the target steering angle θt and a current steering angle (a current state quantity). Furthermore, a vehicle speed and other pieces of vehicle information may be taken into account in calculating the command torque Tf.

Figure 3:
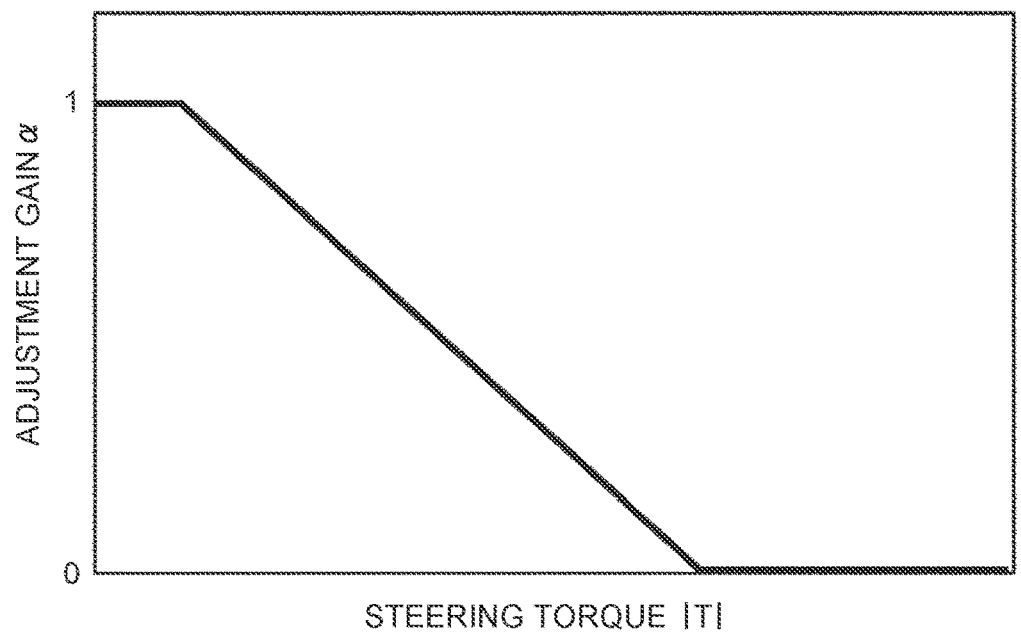
FIG. 3 is a view showing an example of a map for the magnitude of a steering torque for calculating an adjustment gain in accordance with the steering torque.

The adjustment gain calculation processing unit P200 receives a steering torque T, and calculates a gain (adjustment gain) α for the command torque Tf in accordance with the steering torque T. For example, the adjustment gain calculation processing unit P200 converts the steering torque T into the adjustment gain α through the use of a map for the magnitude of the steering torque T. FIG. 3 shows an example of the map for the magnitude |T| of the steering torque T.

FIG. 2 will be referred to again. The adjusted command torque calculation processing unit P300 receives the command torque Tf calculated in the command torque calculation processing unit P100, and the adjustment gain α calculated in the adjustment gain calculation processing unit P200, and generates an adjusted command torque Tc obtained by applying the adjustment gain α to the command torque Tf. The adjusted command torque Tc generated in the adjusted command torque calculation processing unit P300 is output from the ECU 100, and is transmitted to the motor 200. The motor 200 behaves in such a manner as to generate the adjusted command torque Tc.

The adjustment gain α is typically given as a numerical value between 0 and 1 in such a manner as to reduce the command torque Tf in accordance with the magnitude of the steering torque T. That is, the adjusted command torque Tc is adjusted in such a manner as to decrease with respect to the command torque Tf as the steering torque T increases. Thus, when the driver operates the steering wheel 1 with the intention of steering the vehicle in a direction different from the target trajectory, the influence of the torque that is generated by the motor 200 can be reduced. The steering load imposed on the driver can hence be alleviated.

It should be noted herein that the driver feels different in driving the vehicle, depending on whether the driver attempts to generate a steering torque in the direction opposite to the direction of the torque generated by the motor 200 through the follow-up steering function, or the driver attempts to generate a steering torque in the same direction as the direction of the torque. For example, the driver finds the steering wheel 1 heavy to operate when steering the steering wheel 1 normally in such a manner as to move away from the target trajectory (when attempting to generate a steering torque in the opposite direction). The driver feels that the operation of the steering wheel 1 is pushed back hard when steering the steering wheel 1 back (when attempting to generate a steering torque in the same direction) afterward. Therefore, the driver may develop an extreme driving feeling when the driver's steering state with respect to the target trajectory is a certain state. The controllability of the vehicle by the driver may hence be deteriorated.

Thus, the control apparatus according to the present embodiment is characterized in the adjustment gain calculation processing unit P200 to solve the foregoing problem. The outline of the characteristic process performed by the adjustment gain calculation processing unit P200 will be described hereinafter as to the control apparatus according to the present embodiment.

2. OUTLINE

In the control apparatus according to the present embodiment, an adjusted steering torque having predetermined hysteresis characteristics with respect to changes in the steering torque T is calculated in the adjustment gain calculation processing unit P200.

Figure 4:
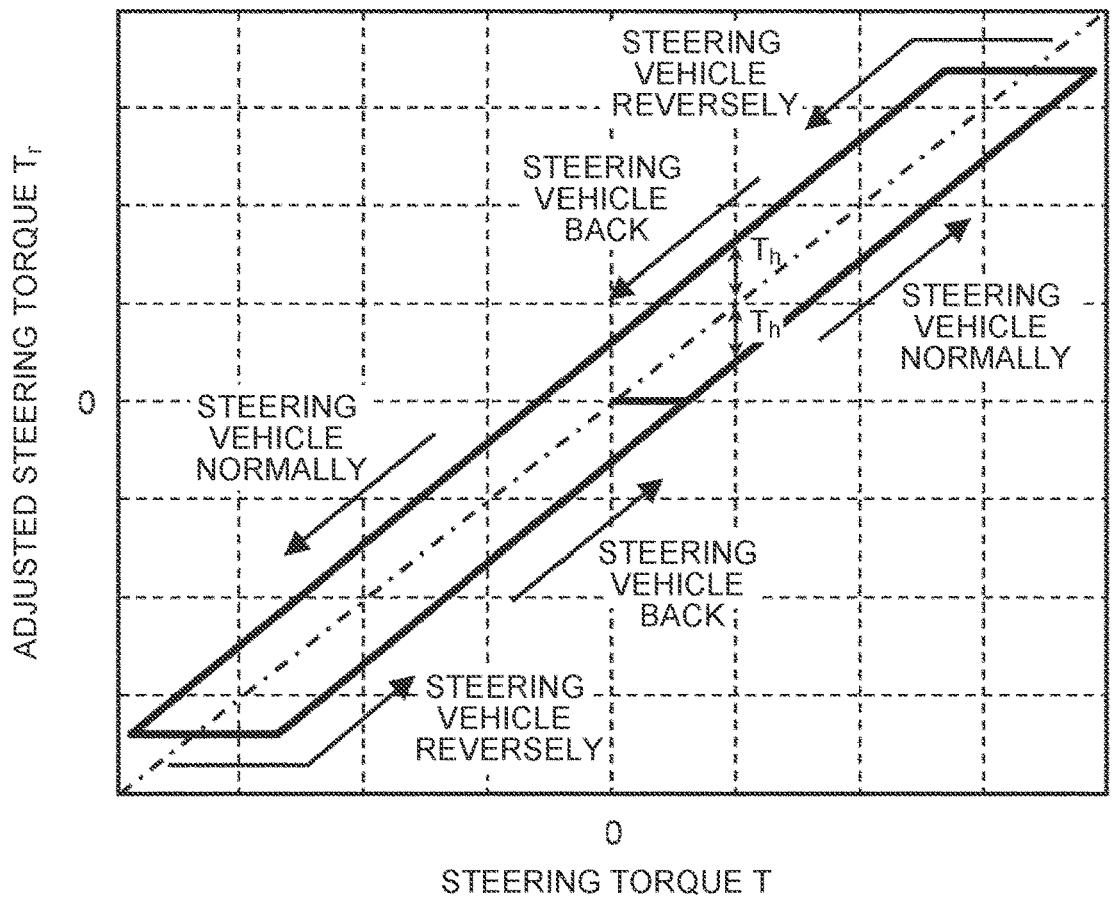
FIG. 4 is a graph showing an example of an adjusted steering torque that is calculated in a control apparatus according to the present embodiment.

FIG. 4 shows an example of the adjusted steering torque Tr that is calculated in the control apparatus according to the present embodiment. As shown in FIG. 4, the adjusted steering torque Tr that is calculated has hysteresis characteristics. The adjusted steering torque Tr increases or decreases in accordance with the steering torque T while the steering torque T increases or decreases. The adjusted steering torque Tr remains equal to a certain value until the steering torque T decreases or increases by a predetermined value or more, when the steering torque T starts decreasing after increasing or starts increasing after decreasing. That is, when the driver turns the steering wheel 1 normally, the adjusted steering torque Tr increases or decreases in accordance with the steering torque T. When the driver turns the steering wheel 1 reversely, the adjusted steering torque Tr is maintained for a while. Besides, due to the presence of hysteresis characteristics, the magnitude |Tr| of the adjusted steering torque Tr at the time when the driver turns the steering wheel 1 normally is smaller than the magnitude |Tr| of the adjusted steering torque Tr at the time when the driver turns the steering wheel 1 back.

The adjusted steering torque Tr having such hysteresis characteristics can be calculated with a simple configuration through the use of a predetermined torque hysteresis Th. In concrete terms, when the absolute value of a difference between a current value of the steering torque T and the adjusted steering torque Tr in the last process (hereinafter referred to also as "an adjusted steering torque deviation") is equal to or smaller than the torque hysteresis Th, the adjusted steering torque Tr in the last process can be calculated as the adjusted steering torque Tr in the current process. The adjusted steering torque Tr in the current process can be calculated in such a direction that the adjusted steering torque deviation decreases, on condition that the adjusted steering torque deviation be larger than the torque hysteresis Th. By calculating the adjusted steering torque Tr in this manner, the magnitude |Tr| of the adjusted steering torque Tr is smaller than the magnitude |T| of the steering torque T by the torque hysteresis Th or more when the driver turns the steering wheel 1 normally. On the other hand, when the driver turns the steering wheel 1 back, the magnitude |Tr| of the adjusted steering torque Tr is larger than the magnitude |T| of the steering torque T by the torque hysteresis Th or more. Besides, when the driver turns the steering wheel 1 reversely, the adjusted steering torque Tr remains equal to a certain value until the steering torque T decreases or increases by the double of the torque hysteresis Th or more.

In particular, the adjusted steering torque Tr in the current process can be calculated in such a direction that the adjusted steering torque deviation decreases, by calculating a value obtained by subtracting the torque hysteresis Th from the current value of the steering torque T as the adjusted steering torque Tr in the current process when the current value of the steering torque T is larger than the adjusted steering torque Tr in the last process, and calculating a value obtained by adding the torque hysteresis Th to the current value of the steering torque T as the adjusted steering torque Tr in the current process when the current value of the steering torque T is smaller than the adjusted steering torque Tr in the last process. By calculating the adjusted steering torque Tr in this manner, the magnitude |Tr| of the adjusted steering torque Tr is smaller than the magnitude |T| of the steering torque T by the torque hysteresis Th when the driver turns the steering wheel 1 normally, as shown in FIG. 4. On the other hand, when the driver turns the steering wheel 1 back, the magnitude |T| of the adjusted steering torque Tr is larger than the magnitude |T| of the steering torque T by the torque hysteresis Th. Besides, when the driver turns the steering wheel 1 reversely, the adjusted steering torque Tr remains equal to a certain value until the steering torque T decreases or increases by the double of the torque hysteresis Th.

Figure 5:
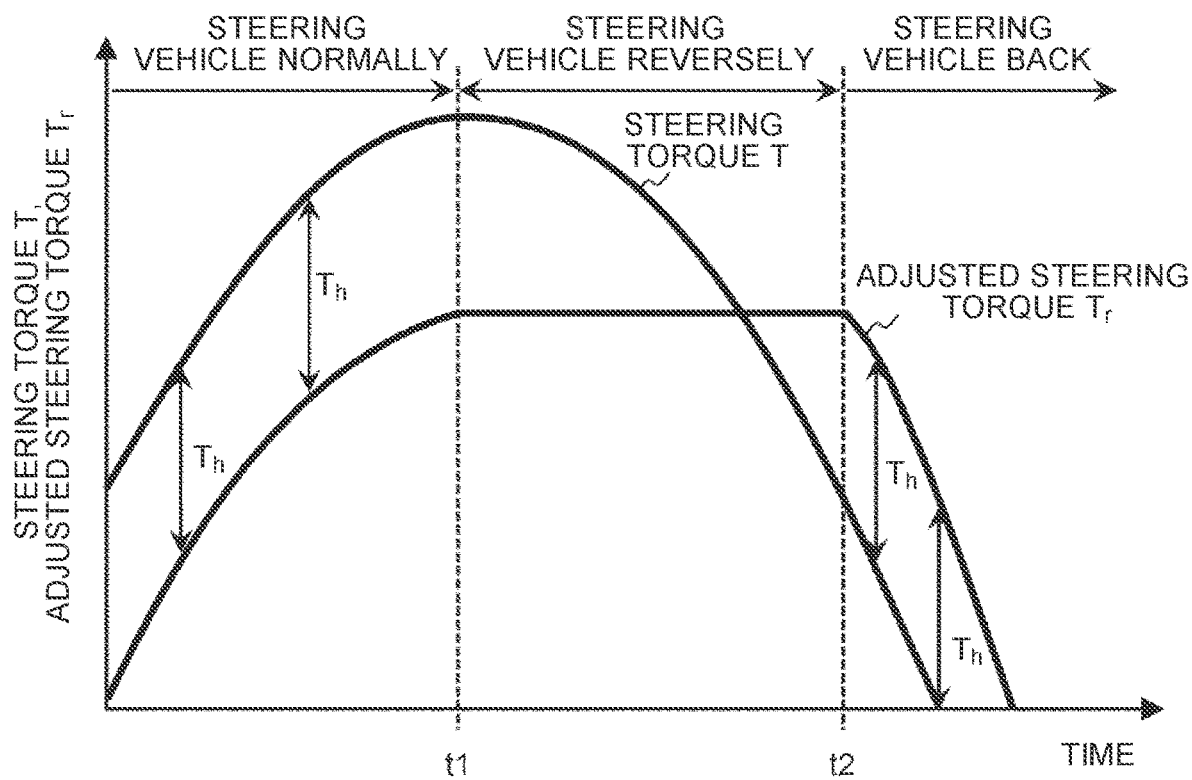
FIG. 5 is a graph showing a practical example of the adjusted steering torque that is calculated when the steering torque is given in such a manner as to steer a steering wheel normally and then steer back the steering wheel.

FIG. 5 shows a practical example of the adjusted steering torque Tr that is calculated when the steering torque T is given in such a manner as to turn the steering wheel 1 normally and then back. In the practical example shown in FIG. 5, it is understood that the adjusted steering torque Tr is smaller than the steering torque T by the torque hysteresis Th in steering the vehicle normally to time t1, and that the adjusted steering torque Tr is larger than the steering torque T by the torque hysteresis Th in steering the vehicle back at and after time t2. Besides, it is understood that the adjusted steering torque Tr is a constant value in steering the vehicle reversely from time t1 to time t2. As described hitherto, according to the present embodiment, the adjusted steering torque Tr can be calculated such that the characteristics with respect to the steering torque T differ depending on whether the vehicle is steered normally or back. In particular, a configuration serving as a time delay element such as a low-pass filter is not included, and no sudden change in values is caused.

Subsequently, in the control apparatus according to the present embodiment, the adjustment gain α is calculated through conversion of the adjusted steering torque Tr calculated, in the adjustment gain calculation processing unit P200. The adjusted steering torque Tr is converted through the use of, for example, a map. It should be noted herein that the map may be similar to the map for the magnitude |T| of the steering torque T as shown in FIG. 3. In this case, the axis of abscissa represents the magnitude |Tr| of the adjusted steering torque Tr in FIG. 3. It should be noted, however, that a preferred map can also be given in accordance with the environment to which the control apparatus according to the present embodiment is applied. For example, the map may be designed such that the adjustment gain α nonlinearly decreases from 1 to 0 as the magnitude |Tr| of the adjusted steering torque Tr increases.

Figure 6:
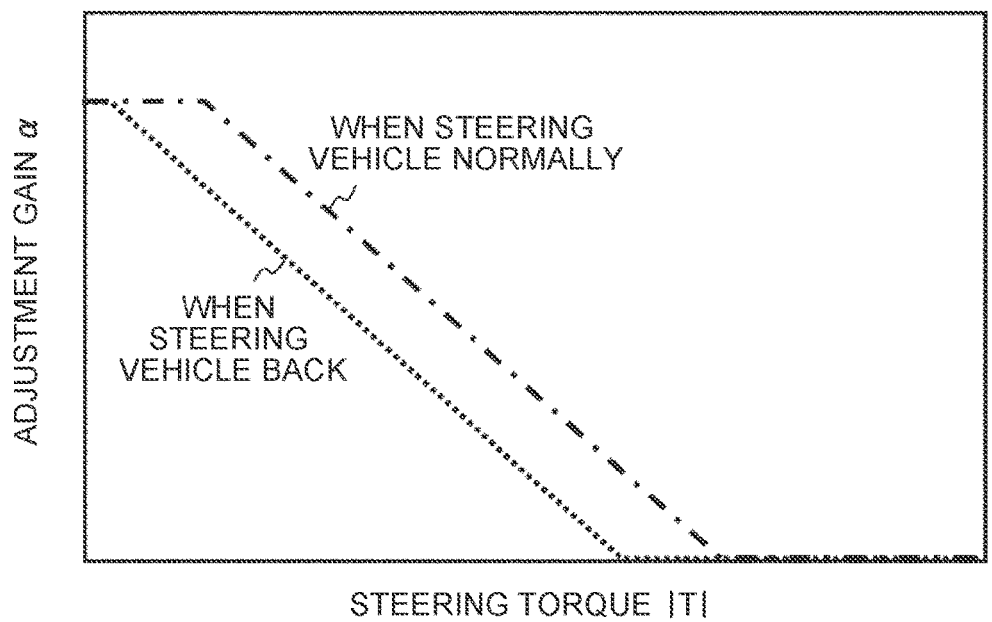
FIG. 6 is a view showing an example of the adjustment gain with respect to the magnitude of the steering torque in the case where the adjustment gain is calculated through conversion of the adjusted steering torque through the use of the map shown in FIG. 3.

According to the present embodiment, the adjusted steering torque Tr has predetermined hysteresis characteristics. Thus, the characteristics of the adjusted steering torque Tr with respect to the steering torque T differ depending on whether the vehicle is steered normally or back. Accordingly, the adjustment gain α can be given such that the characteristics with respect to the steering torque T differ depending on whether the vehicle is steered normally or back, by being calculated through conversion of the adjusted steering torque Tr. FIG. 6 shows an example of the adjustment gain α with respect to the magnitude |T| of the steering torque T in the case where the adjustment gain α is calculated through conversion of the adjusted steering torque Tr through the use of the map shown in FIG. 3. It should be noted herein that the graph shown in FIG. 6 represents the adjustment gain α that is calculated with respect to the steering torque T in quasi-steady steering (the steering speed≈0). As shown in FIG. 6, the adjustment gain α is given such that the characteristics with respect to the steering torque T differ depending on whether the vehicle is steered normally (indicated by an alternate long and short dash line) or back (indicated by a dotted line). In particular, the adjustment gain α in steering the vehicle normally can be given in such a manner as to be smaller than the adjustment gain α in steering the vehicle back. Besides, the adjustment gain α can be maintained for a while in steering the vehicle reversely.

As described hitherto, according to the present embodiment, the adjustment gain α with the characteristics with respect to the steering torque that differ depending on whether the vehicle is steered normally or back is calculated, in the adjustment gain calculation processing unit P200. Thus, the torque that is generated by the motor 200 through the follow-up steering function can be made different depending on whether the vehicle is steered normally or back. In particular, the adjustment gain α in steering the vehicle normally is given in such a manner as to be smaller than the adjustment gain α in steering the vehicle back. That is, the torque that is generated by the motor 200 in steering the vehicle back can be made smaller than the torque that is generated by the motor 200 in steering the vehicle normally. The feeling of the steering of the steering wheel 1 being pushed back hard can hence be reduced in steering the vehicle back. Besides, the adjustment gain α is maintained for a while in steering the vehicle reversely. That is, the torque that is generated by the motor 200 does not suddenly change in steering the vehicle reversely. As described hitherto, according to the present embodiment, the controllability of the vehicle by the driver can be appropriately enhanced in accordance with the steering state with respect to the target trajectory.

Incidentally, the control apparatus according to the present embodiment may be configured to change the torque hysteresis Th used in calculating the adjusted steering torque Tr in accordance with the steering torque T. For example, the torque hysteresis Th is changed in such a manner as to increase as the magnitude |T| of the steering torque T increases. This configuration can be realized by, for example, giving the torque hysteresis Th through the use of the map for the magnitude |T| of the steering torque T.

Due to this configuration, the steering load imposed on the driver can be more appropriately alleviated by, for example, adopting the large torque hysteresis Th when the magnitude |T| of the steering torque T is large. Furthermore, the range of the value that can be assumed by the adjustment gain α can be restrained from being limited by the value of the steering torque T (especially in steering the vehicle back), by giving a nonlinear map in such a manner as to ensure that the adjustment gain α that is calculated when the steering torque T is 0 becomes 1. The object of alleviating the steering load imposed on the driver and the object of securing the performance of the follow-up steering function when the driver does not steer the vehicle can hence be made compatible with each other.

Figure 7:
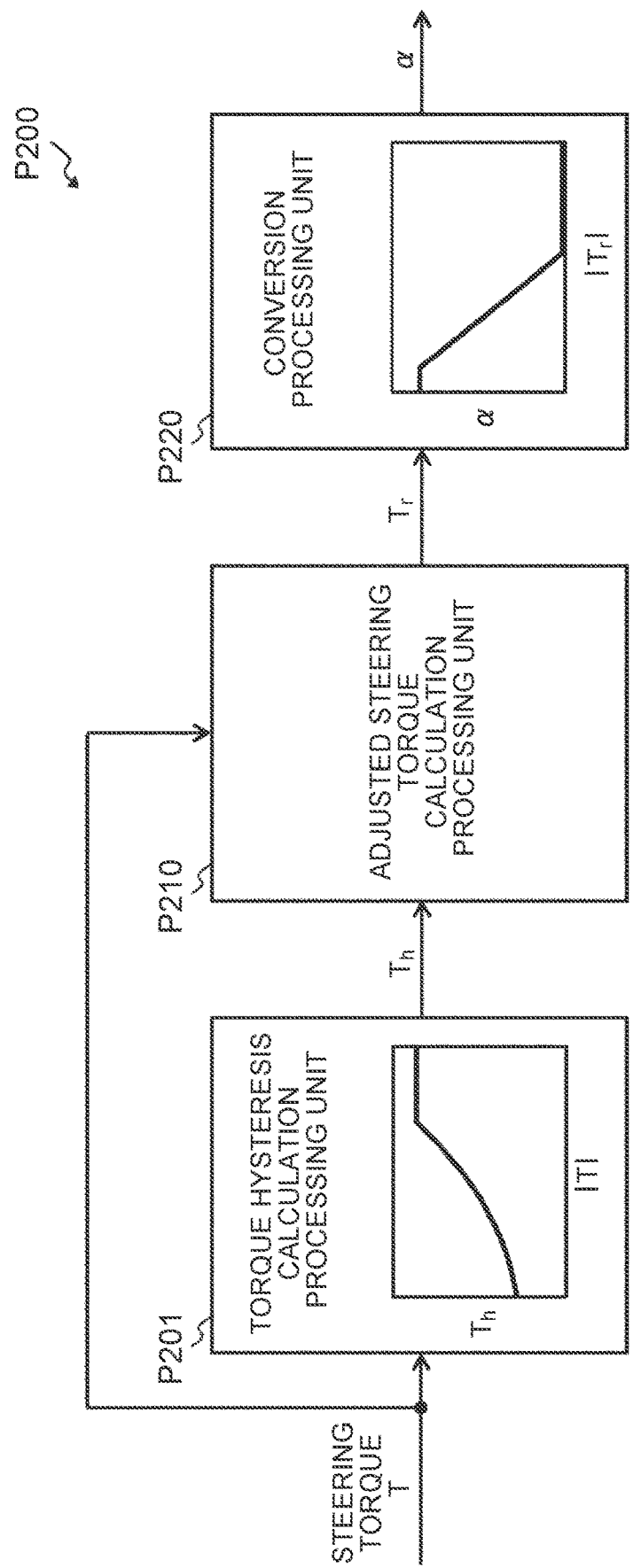
FIG. 7 is a block diagram showing a configuration example of an adjustment gain calculation processing unit in the control apparatus according to the present embodiment.

FIG. 7 shows a configuration example of the adjustment gain calculation processing unit P200 in the control apparatus according to the present embodiment. In FIG. 7, the adjustment gain calculation processing unit P200 is constituted of a torque hysteresis calculation processing unit P201, an adjusted steering torque calculation processing unit P210, and a conversion processing unit P220.

The torque hysteresis calculation processing unit P201 receives the steering torque T, and calculates the torque hysteresis Th in accordance with the steering torque T. In the configuration example shown in FIG. 7, the torque hysteresis Th is calculated through the use of the map for the magnitude |T| of the steering torque T.

The adjusted steering torque calculation processing unit P210 receives the steering torque T and the torque hysteresis Th calculated in the torque hysteresis calculation processing unit P201, and calculates the adjusted steering torque Tr based on the steering torque T (a first process). As described previously, the adjusted steering torque Tr is calculated in such a manner as to have the predetermined hysteresis characteristics with respect to changes in the steering torque through the use of the torque hysteresis Th.

The conversion processing unit P220 receives the adjusted steering torque Tr calculated in the adjusted steering torque calculation processing unit P210, and calculates the adjustment gain α through conversion of the adjusted steering torque Tr (a second process). In the configuration example shown in FIG. 7, the adjustment gain α is calculated through the use of the map for the magnitude |Tr| of the adjusted steering torque Tr.

2. CONFIGURATION

A configuration example of the control apparatus according to the present embodiment (the ECU 100), and a configuration example of processes that are performed by the control apparatus according to the present embodiment (the ECU 100) will be described hereinafter.

2-1. Configuration of Control Apparatus

Figure 8:
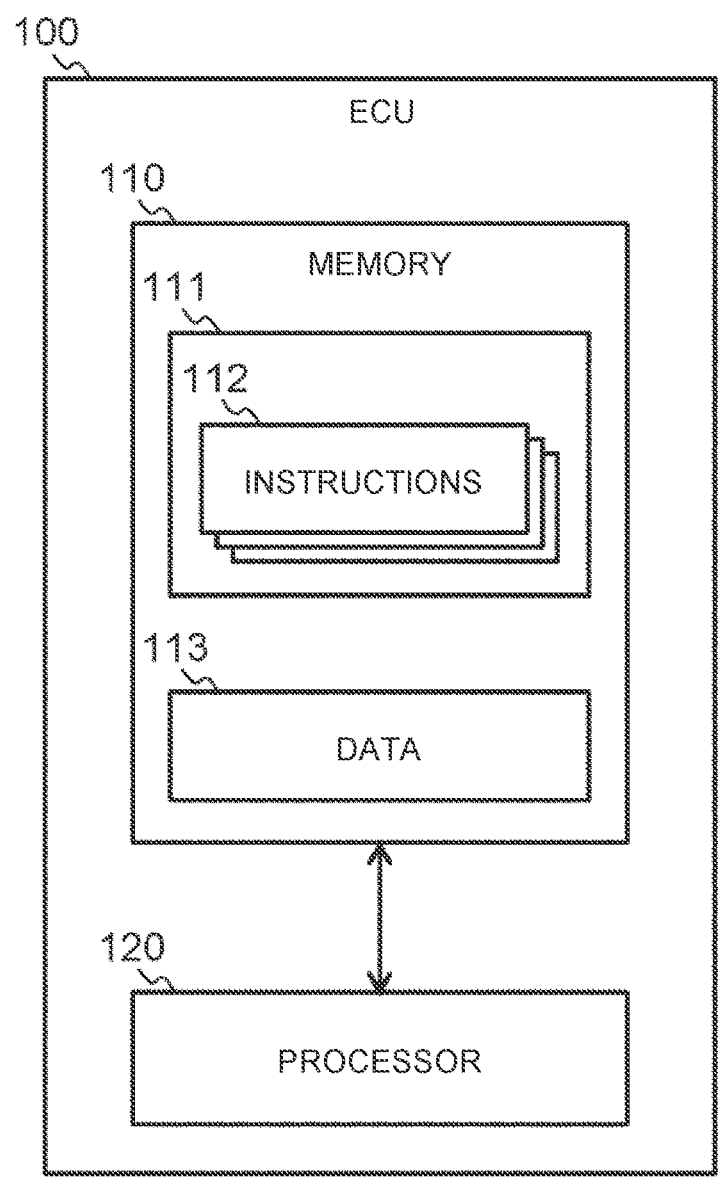
FIG. 8 is a block diagram showing a configuration example of the control apparatus according to the present embodiment.

FIG. 8 is a block diagram showing a configuration example of the control apparatus according to the present embodiment (the ECU 100). The ECU 100 is a computer including a memory 110 and a processor 120. The memory 110 is linked with the processor 120, and stores a plurality of feasible instructions 112 and various pieces of data 113 needed to perform the processes. The instructions 112 are given by the program 111. In this sense, the memory 110 can also be referred to as "a program memory".

The processor 120 behaves in accordance with the instructions 112, and the performance of various processes based on the data 113 is thereby realized. Thus, the performance of the processes regarding the command torque calculation processing unit P100, the adjustment gain calculation processing unit P200, and the adjusted command torque calculation processing unit P300 is realized in the ECU 100. Besides, in the case where the ECU 100 has a function regarding steering stability control, the performance of a process regarding steering stability control is realized.

2-2. Configuration of Processes

Figure 9:
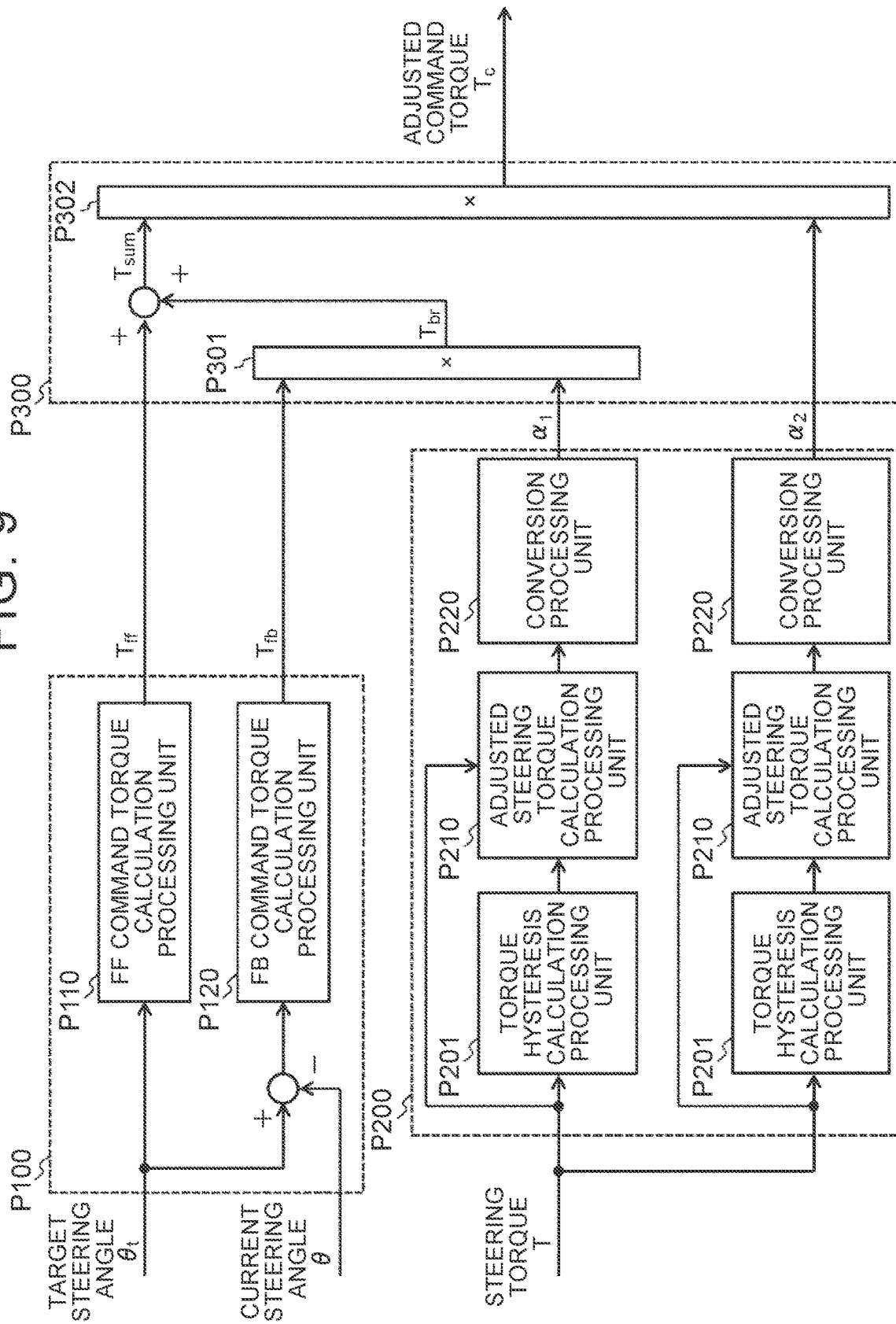
FIG. 9 is a block diagram showing a configuration example of processes that are performed by the control apparatus according to the present embodiment.

FIG. 9 is a block diagram showing a configuration example of processes that are performed by the control apparatus according to the present embodiment (the ECU 100), especially processes regarding calculation of the torque (the adjusted command torque Tc) that is generated by the motor 200 as the follow-up steering function.

In the configuration example of the processes shown in FIG. 9, the command torque Tf calculated in the command torque calculation processing unit P100 includes an FF command torque Tff that is a feedforward control amount based on the target steering angle θt, and an FB command torque Tfb that is a feedback control amount based on a difference between the target steering angle θt and a current steering angle θ. Therefore, in the configuration example shown in FIG. 9, the command torque calculation processing unit P100 includes an FF command torque calculation processing unit P110 and an FB command torque calculation processing unit P120.

The FF command torque calculation processing unit P110 receives the target steering angle θt, and calculates the FF command torque Tff based on the target steering angle θt. The FB command torque calculation processing unit P120 receives a difference between the target steering angle θt and the current steering angle θ, and calculates the FB command torque Tfb based on the difference between the target steering angle θt and the current steering angle θ.

Incidentally, a preferred known technology may be adopted in the processes regarding feedforward control in the FF command torque calculation processing unit P110 and feedback control in the FB command torque calculation processing unit P120. In particular, it is possible to adopt a configuration that takes the vehicle speed and other pieces of vehicle information into account. Besides, the current steering angle θ is typically acquired from the steering angle sensor 21.

In the configuration example shown in FIG. 9, the adjustment gain α calculated in the adjustment gain calculation processing unit P200 includes a first adjustment gain α1 and a second adjustment gain α2. Therefore, in the configuration example shown in FIG. 9, the adjustment gain calculation processing unit P200 includes a configuration similar to that described with reference to FIG. 7, as to each of the first adjustment gain al and the second adjustment gain α2. It should be noted, however, that the torque hysteresis calculation processing unit P201, the adjusted steering torque calculation processing unit P210, and the conversion processing unit P220 may be provided with characteristics that differ depending on whether the first adjustment gain al or the second adjustment gain α2 is concerned. For example, the torque hysteresis calculation processing unit P201 regarding the first adjustment gain al and the torque hysteresis calculation processing unit P201 regarding the second adjustment gain α2 may adopt maps that are different from each other, or the conversion processing unit P220 regarding the first adjustment gain al and the conversion processing unit P220 regarding the second adjustment gain α2 may adopt maps that are different from each other. That is, the characteristics corresponding to the first adjustment gain al and the characteristics corresponding to the second adjustment gain α2 may be given.

Moreover, in the configuration example shown in FIG. 9, an adjusted FB command torque Tbr obtained by applying the first adjustment gain al to the FB command torque Tfb is calculated in the adjusted command torque calculation processing unit P300 (P301). Then, a value obtained by applying the second adjustment gain α2 to a sum Tsum of the FF command torque Tff and the adjusted FB command torque Tbr is calculated as the adjusted command torque Tc (P302).

According to the configuration example of the processes shown in FIG. 9, the first adjustment gain al and the second adjustment gain α2 are calculated through a configuration similar to that described with reference to FIG. 7. Accordingly, as described previously, the controllability of the vehicle by the driver can be enhanced.

By the way, the configuration example shown in FIG. 9 is especially characterized in that the first adjustment gain al applied to the FB command torque Tfb and the second adjustment gain α2 applied to the sum Tsum of the FF command torque Tff and the adjusted FB command torque Tbr are separately calculated in the adjustment gain calculation processing unit P200. By adopting this configuration, the controllability of the vehicle by the driver can be appropriately enhanced both when the target trajectory is a straight trajectory and when the target trajectory is a turning trajectory. This is because of the following reason.

In general, when the target trajectory is a turning trajectory, the FF command torque Tff greatly contributes towards the performance of following the target trajectory. On the other hand, when the target trajectory is a straight trajectory, the FB command torque Tfb greatly contributes towards the performance of following the target trajectory. In particular, the FF command torque Tff is typically 0 when the target trajectory is a straight trajectory. Therefore, for the purpose of sufficiently securing the follow-up performance of the follow-up steering function, the command torque calculation processing unit P100 includes the FF command torque calculation processing unit P110 and the FB command torque calculation processing unit P120.

A case where the adjustment gain α does not include the first adjustment al and the second adjustment gain α2 will now be considered. At this time, the adjustment gain α is assumed to be applied to the sum of the FF command torque Tff and the FB command torque Tfb. In this case, it is assumed that the adjustment gain α is given such that the controllability of the vehicle by the driver can be sufficiently enhanced when the target trajectory is a straight trajectory. That is, it is assumed that the adjustment gain α that is sufficiently smaller than the magnitude |T| of the steering torque T is given. At this time, for example, if the driver attempts to steer the vehicle inward of a turning trajectory when the target trajectory is the turning trajectory, the adjustment gain α is small, so the amount of contribution of the FF command torque Tff is excessively small. As a result, it may become impossible to generate a torque needed to make a turn. A phenomenon that the vehicle moves outward of the turning trajectory despite the driver's desire to steer the vehicle inward of the turning trajectory may hence occur.

On the other hand, if the adjustment gain α is given such that a torque needed to make a turn can be secured when the target trajectory is a turning trajectory, the controllability of the vehicle by the driver cannot be sufficiently enhanced when the target trajectory is a straight trajectory.

Thus, a tradeoff as described above can be eliminated by configuring the adjustment gain calculation processing unit P200 to calculate the first adjustment gain al and the second adjustment gain α2 separately. That is, appropriate characteristics can be given to the first adjustment gain al and the second adjustment gain α2 respectively such that the controllability of the vehicle by the driver can be appropriately enhanced, both when the target trajectory is a straight trajectory and when the target trajectory is a turning trajectory.

Incidentally, according to the foregoing description, the adjusted command torque calculation processing unit P300 may be configured to calculate the sum of the value obtained by applying the second adjustment gain α2 to the FF command torque Tff and the adjusted FB command torque Tbr, as the adjusted command torque Tc. By adopting this configuration as well, a similar effect can be exerted.

3. ADJUSTED STEERING TORQUE CALCULATION PROCESS

Figure 10:
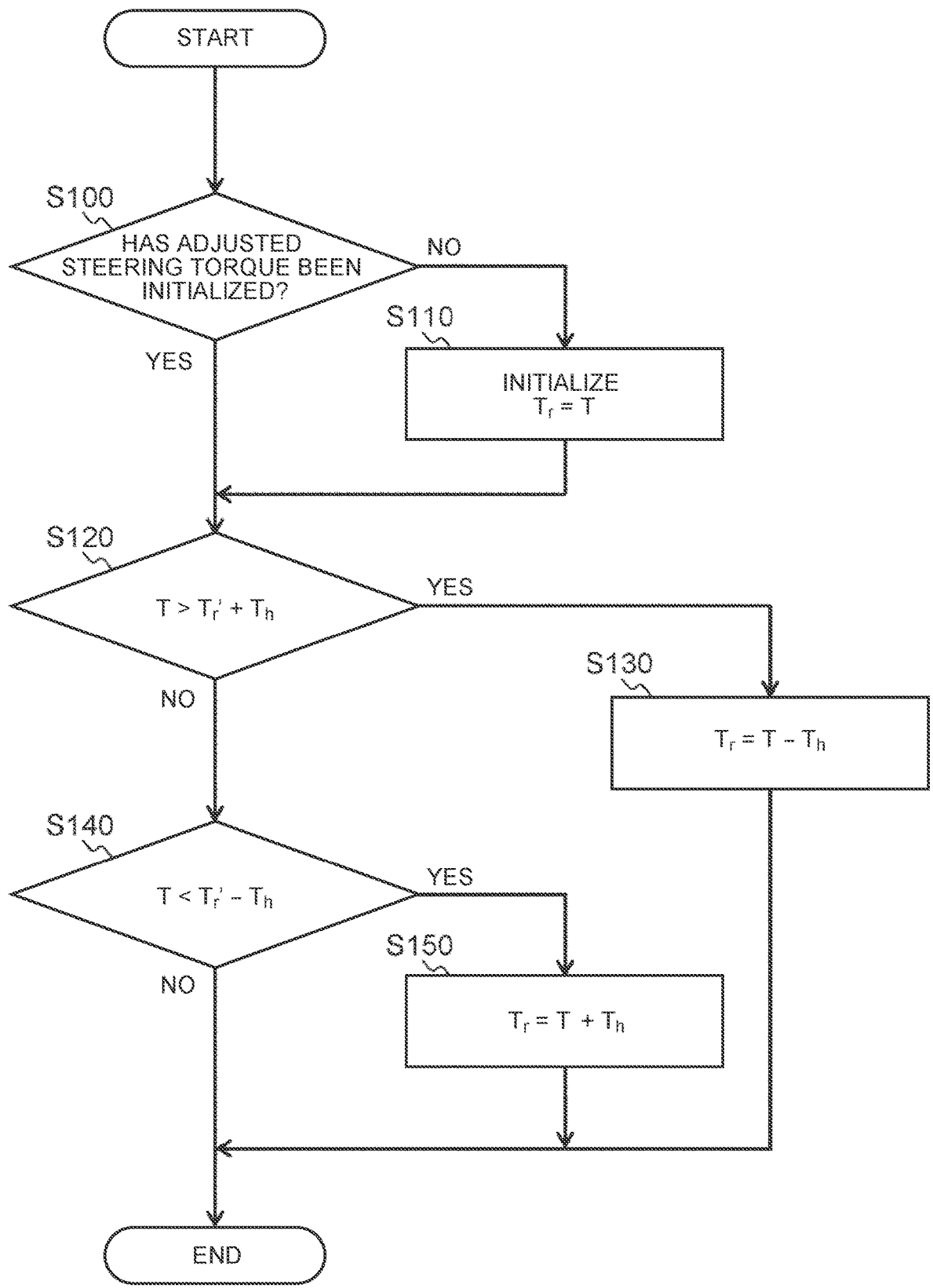
FIG. 10 is a flowchart showing a preferred example of a processing routine in an adjusted steering torque calculation processing unit.

A processing routine in the adjusted steering torque calculation processing unit P210 will be described hereinafter with reference to FIG. 10. FIG. 10 is a flowchart showing a preferred example of the processing routine in the adjusted steering torque calculation processing unit P210. The processing routine shown in FIG. 10 may be executed on a predetermined processing cycle (e.g., at intervals of five milliseconds). Incidentally, the adjusted steering torque Tr in the last process is expressed as Tr' in FIG. 10.

In step S100, it is determined whether or not the adjusted steering torque Tr has been initialized. If the adjusted steering torque Tr has not been initialized (No in step S100), the current value of the steering torque T is adopted as the adjusted steering torque Tr (step S110). If the adjusted steering torque Tr has been initialized (Yes in step S100), the process proceeds to step S120. Incidentally, step S110 is typically carried out when the follow-up steering function is started.

In step S120, it is determined whether or not the steering torque T is larger than the sum of the adjusted steering torque Tr' in the last process and the torque hysteresis Th.

If the steering torque T is larger than the sum of the adjusted steering torque Tr' in the last process and the torque hysteresis Th (Yes in step S120), a value obtained by subtracting the torque hysteresis Th from the steering torque T is adopted as the adjusted steering torque Tr in the current process (step S130), and the current process is ended. If the steering torque T is not larger than the sum of the adjusted steering torque Tr' in the last process and the torque hysteresis Th (No in step S120), the process proceeds to step S140.

In step S140, it is determined whether or not the steering torque T is smaller than a difference between the adjusted steering torque Tr' in the last process and the torque hysteresis Th.

If the steering torque T is smaller than the difference between the adjusted steering torque Tr' in the last process and the torque hysteresis Th (Yes in step S140), a value obtained by adding the torque hysteresis Th to the steering torque T is adopted as the adjusted steering torque Tr in the current process (step S150), and the current process is ended. If the steering torque T is not smaller than the difference between the adjusted steering torque Tr' in the last process and the torque hysteresis Th (No in step S140), the current process is ended without computing the adjusted steering torque Tr. That is, in this case, the adjusted steering torque Tr in the current process is equal to the adjusted steering torque Tr' in the last process.

Incidentally, the processing regarding step S120 and step S140 can also be considered to determine whether or not the adjusted steering torque deviation is larger than the torque hysteresis Th. That is, when the adjusted steering torque deviation is larger than the torque hysteresis Th, the processing regarding step S130 or step S150 is performed. In particular, the processing regarding step S130 is performed when the steering torque T is larger than the adjusted steering torque Tr' in the last process, and the processing regarding step S150 is performed when the steering torque T is smaller than the adjusted steering torque Tr' in the last process. Besides, the processing regarding step S130 and step S150 can be considered to calculate the adjusted steering torque Tr in the current process in such a direction as to reduce the adjusted steering torque deviation.

By executing this processing routine, the adjusted steering torque Tr having the predetermined hysteresis characteristics with respect to changes in the steering torque T as shown in FIG. 4 can be calculated in the adjusted command torque calculation processing unit P300. Besides, a control method according to the present embodiment is realized by the control apparatus configured in this manner.

4. EFFECTS

As described above, according to the present embodiment, the adjustment gain α having the characteristics with respect to the steering torque that differ depending on whether the vehicle is steered normally or back is calculated in the adjustment gain calculation processing unit P200. Then, the adjusted command torque Tc is calculated by applying the adjustment gain α thus calculated to the command torque Tf, and the steering mechanism 10 is controlled in accordance with the adjusted command torque Tc. Thus, the torque generated by the motor 200 through the follow-up steering function can be made different depending on whether the vehicle is steered normally or back. In particular, the adjustment gain α in steering the vehicle normally is given in such a manner as to become smaller than the adjustment gain α in steering the vehicle back. That is, the torque generated by the motor 200 in steering the vehicle back can be made smaller than the torque generated by the motor 200 in steering the vehicle normally. The feeling of the steering of the steering wheel 1 being pushed back hard can hence be reduced in steering the vehicle back. Besides, the adjustment gain α is maintained for a while in steering the vehicle reversely. That is, the torque generated by the motor 200 does not suddenly change in steering the vehicle reversely. As described hitherto, according to the present embodiment, the controllability of the vehicle by the driver can be appropriately enhanced in accordance with the steering state with respect to the target trajectory.

Furthermore, according to the present embodiment, calculation of the adjustment gain α having the characteristics that differ depending on the steering state can be realized without making a determination on the driver's steering state with respect to the target trajectory. This is an advantage in a situation where, for example, the driver attempts to slightly modify the trajectory of the vehicle. This is because of the following reason.

In general, when the driver attempts to slightly modify the trajectory of the vehicle, the operation amount is small. Therefore, when an attempt is made to make a determination on the driver's steering state, the state quantity for making the determination is also small. That is, in the case where conversion characteristics regarding the adjustment gain α are given in accordance with the determined steering state, the adjustment gain α needs to be changed within such a range that the change in the state quantity is small. However, when the vehicle actually runs, the operation amount is assumed to be detected due to road surface disturbances and the like even in the case where the driver does not intentionally steer the vehicle. The state quantity is hence assumed to change in the vicinity of 0. Therefore, changing the adjustment gain α within such a range that the change in the state quantity is small may lead to unintended fluctuations in the adjustment gain α. As described hitherto, giving the conversion characteristics regarding the adjustment gain α in accordance with the determined steering state may make the enhancement of the performance of following the target trajectory and the enhancement of the controllability of the vehicle by the driver incompatible with each other, in a situation where, for example, the driver attempts to slightly modify the trajectory of the vehicle.

Incidentally, it is also conceivable to reduce the operation amount unintended by the driver through the use of a low-pass filter. In this case, however, the use of the low-pass filter results in a response delay, so the driver may develop a feeling of strangeness in steering the vehicle, and it may become impossible to sufficiently reduce the feeling of steering being pushed back hard. On the other hand, according to the present embodiment, the use of the low-pass filter is not indispensable. It should be noted, however, that the low-pass filter can also be applied to the calculated adjustment gain α in consideration of the influence on the responsiveness and the steering feeling. Thus, characteristics that are smoother with respect to changes in the steering torque T can be expected to be realized.

5. PRACTICAL EXAMPLES

Figure 11A:
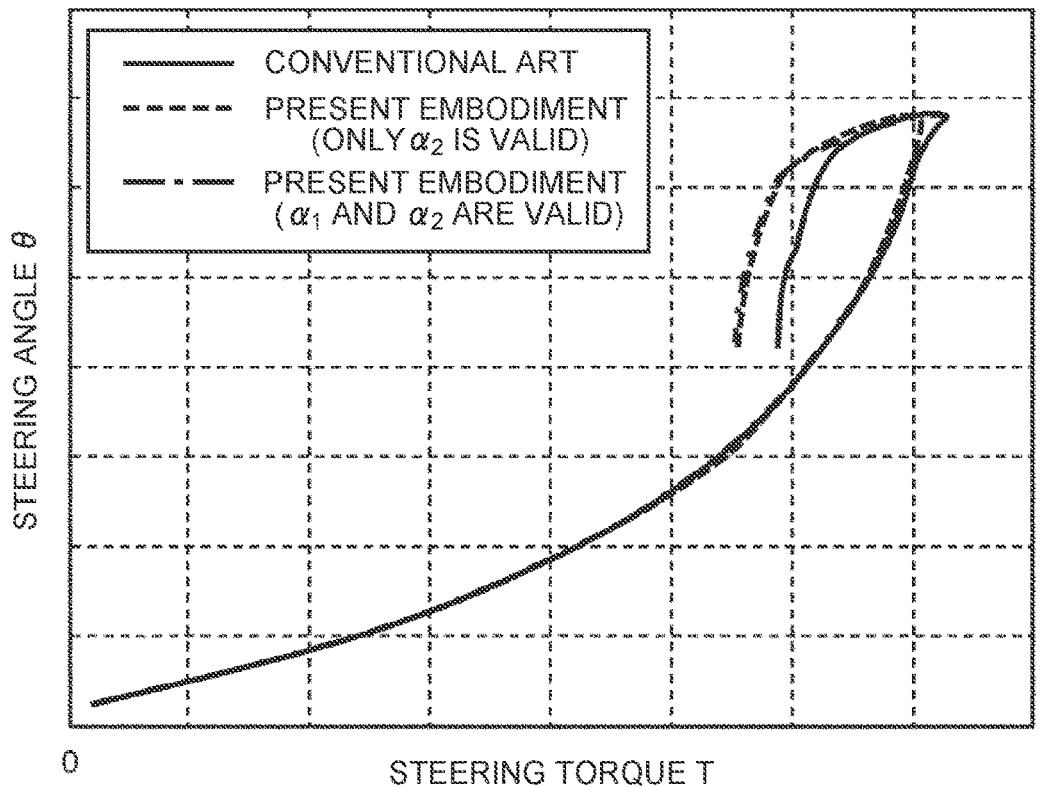
FIG. 11A is a graph showing a result of comparison between a conventional art and a practical example according to the present embodiment in the case where a driver carries out sign steering when a target trajectory is a straight trajectory.
Figure 11B:
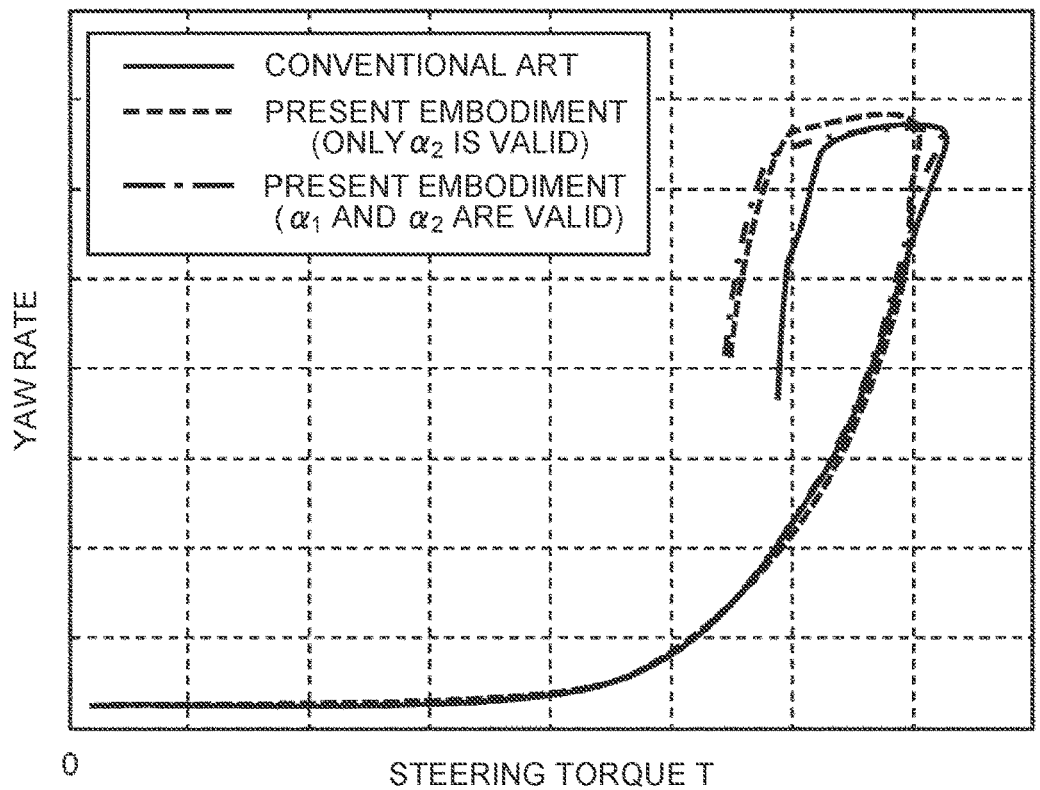
FIG. 11B is a graph showing a result of comparison between the conventional art and the practical example according to the present embodiment in the case where the driver carries out sign steering when the target trajectory is a straight trajectory.

Each of FIG. 11A and FIG. 11B shows a result of comparison between the conventional art and the practical examples according to the present embodiment in the case where the driver carries out sign steering when the target trajectory is a straight trajectory. It should be noted herein that the practical example of the conventional art (indicated by solid lines) corresponds to a case where the adjustment gain α is given to the magnitude |T| of the steering torque T as shown in FIG. 3. Besides, as for the practical examples according to the present embodiment, two practical examples, namely, the practical example in which only the second adjustment gain α2 is regarded as valid and applied in the adjusted command torque calculation processing unit P300 (indicated by broken lines) and the practical example in which both the first adjustment gain α1 and the second adjustment gain α2 are regarded as valid and applied in the adjusted command torque calculation processing unit P300 (indicated by alternate long and short dashes lines) are presented. Incidentally, FIG. 11A shows Lissajous characteristics of the steering angle θ with respect to the steering torque T, and FIG. 11B shows Lissajous characteristics of the yaw rate with respect to the steering torque T.

As shown in FIGS. 11A and 11B, it is understood that according to the present embodiment, the vehicle is steered reversely with more wiggle room than in the conventional art. It is understood that the controllability of the vehicle is hence enhanced in steering the vehicle back. Besides, it is understood that when the target trajectory is a straight trajectory, even in the case where only the second adjustment gain α2 is regarded as valid and applied, characteristics similar to those in the case where both the first adjustment gain α1 and the second adjustment gain α2 are regarded as valid and applied can be realized.

Figure 12A:
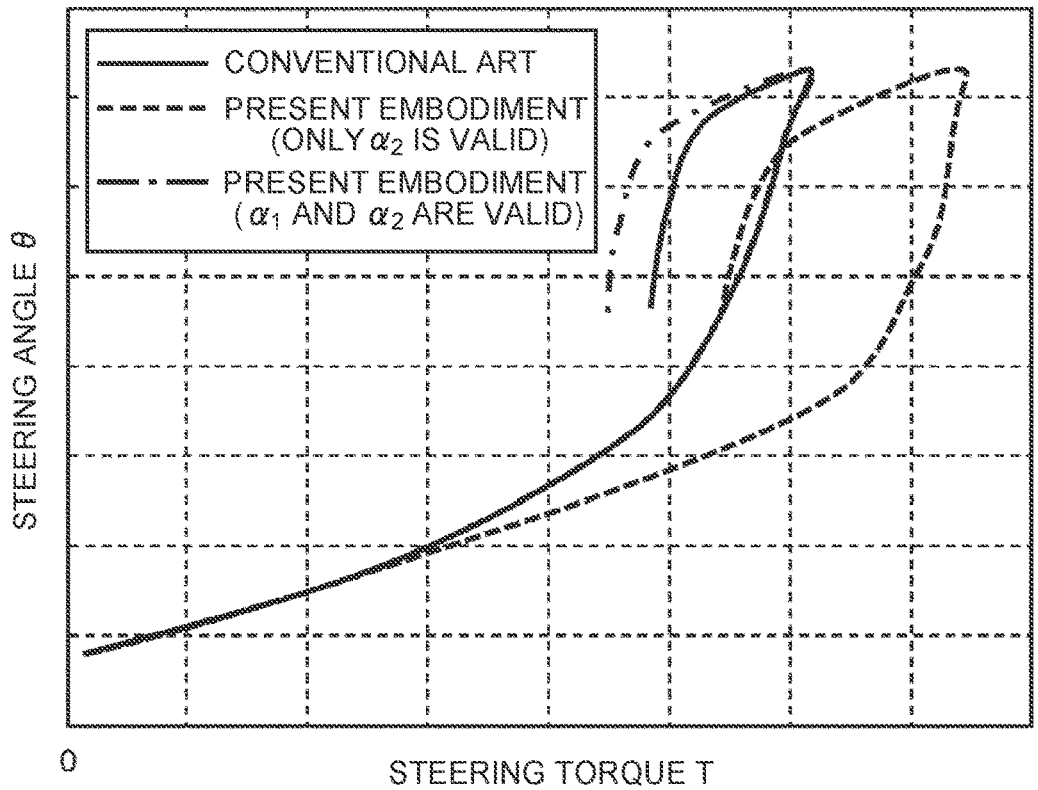
FIG. 12A is a graph showing a result of comparison between the conventional art and the practical example according to the present embodiment in the case where the driver carries out sign steering in an inward turning direction when the target trajectory is a turning trajectory.
Figure 12B:
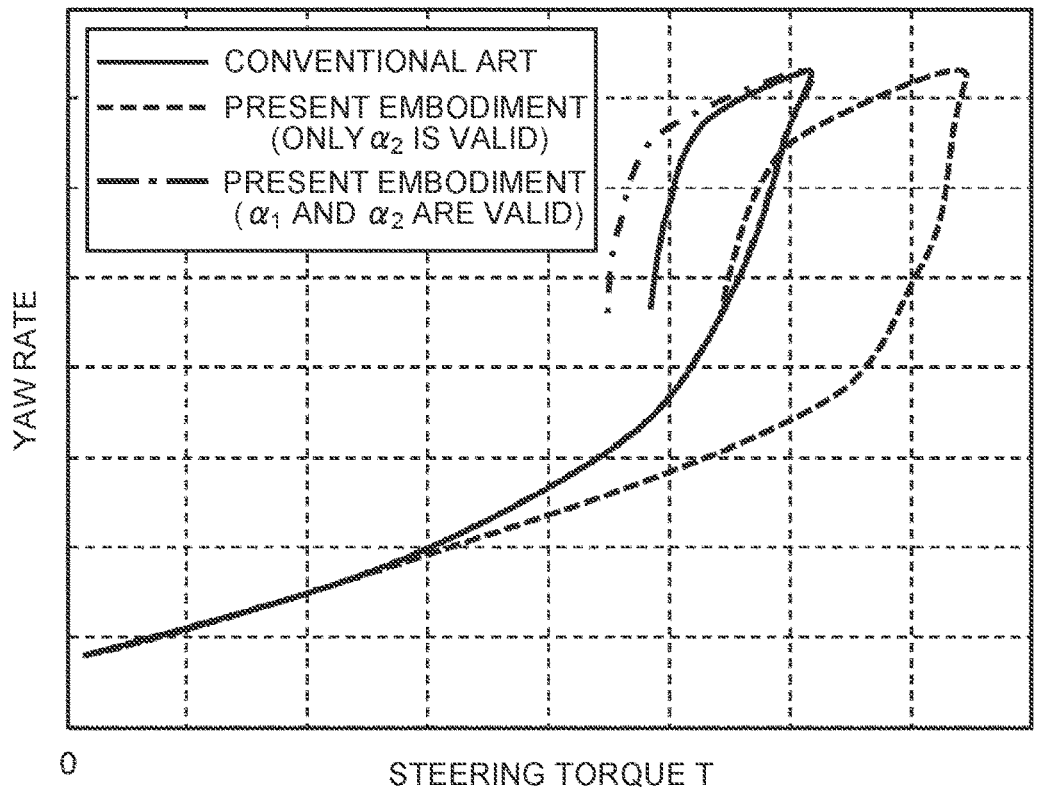
FIG. 12B is a graph showing a result of comparison between the conventional art and the practical example according to the present embodiment in the case where the driver carries out sign steering in the inward turning direction when the target trajectory is a turning trajectory.

Each of FIG. 12A and FIG. 12B shows a result of comparison between the conventional art and the practical examples according to the present embodiment in the case where the driver carries out sign steering in an inward turning direction when the target trajectory is a turning trajectory. In particular, FIG. 12A and FIG. 12B show the practical examples in the case where the vehicle runs at 80 km/h on a road of 500 R. As is the case with FIG. 11A and FIG. 11B, FIG. 12A shows Lissajous characteristics of the steering angle θ with respect to the steering torque T, and FIG. 12B shows Lissajous characteristics of the yaw rate with respect to the steering torque T.

As shown in FIG. 12A and FIG. 12B, it is understood that according to the present embodiment, the vehicle is steered reversely with some wiggle room even when the target trajectory is a turning trajectory as well as when the target trajectory is a straight trajectory. It should be noted, however, that the characteristics with small changes in the steering angle θ and the yaw rate with respect to the steering torque T are realized and the driver may find it difficult to steer the vehicle in the inward turning direction when only the second adjustment gain α2 is regarded as valid and applied. On the other hand, it is understood that the vehicle is steered with some wiggle room and the characteristics allowing the driver to steer the vehicle in the inward turning direction with ease can be realized, by regarding both the first adjustment gain α1 and the second adjustment gain α2 as valid and applying these adjustment gains.

6. MODIFICATION EXAMPLES

The present embodiment may adopt modes modified as follows. Incidentally, the description of the same contents as described previously will be omitted hereinafter as appropriate.

6-1. First Modification Example

In the adjustment gain calculation processing unit P200, the torque hysteresis calculation processing unit P201 or the conversion processing unit P220 may be configured to change the characteristics in accordance with the vehicle speed. For example, there is adopted a configuration in which the map in the torque hysteresis calculation processing unit P201 or the conversion processing unit P220 is changed in accordance with the vehicle speed. Alternatively, the adjusted command torque calculation processing unit P300 may be configured to further apply a vehicle speed gain given in accordance with the vehicle speed to the command torque Tf.

In general, the driver's feeling of driving differs depending on the vehicle speed. Accordingly, the controllability of the vehicle can be more appropriately enhanced in accordance with the vehicle speed, by adopting the first modification example.

6-2. Second Modification Example

Figure 13:
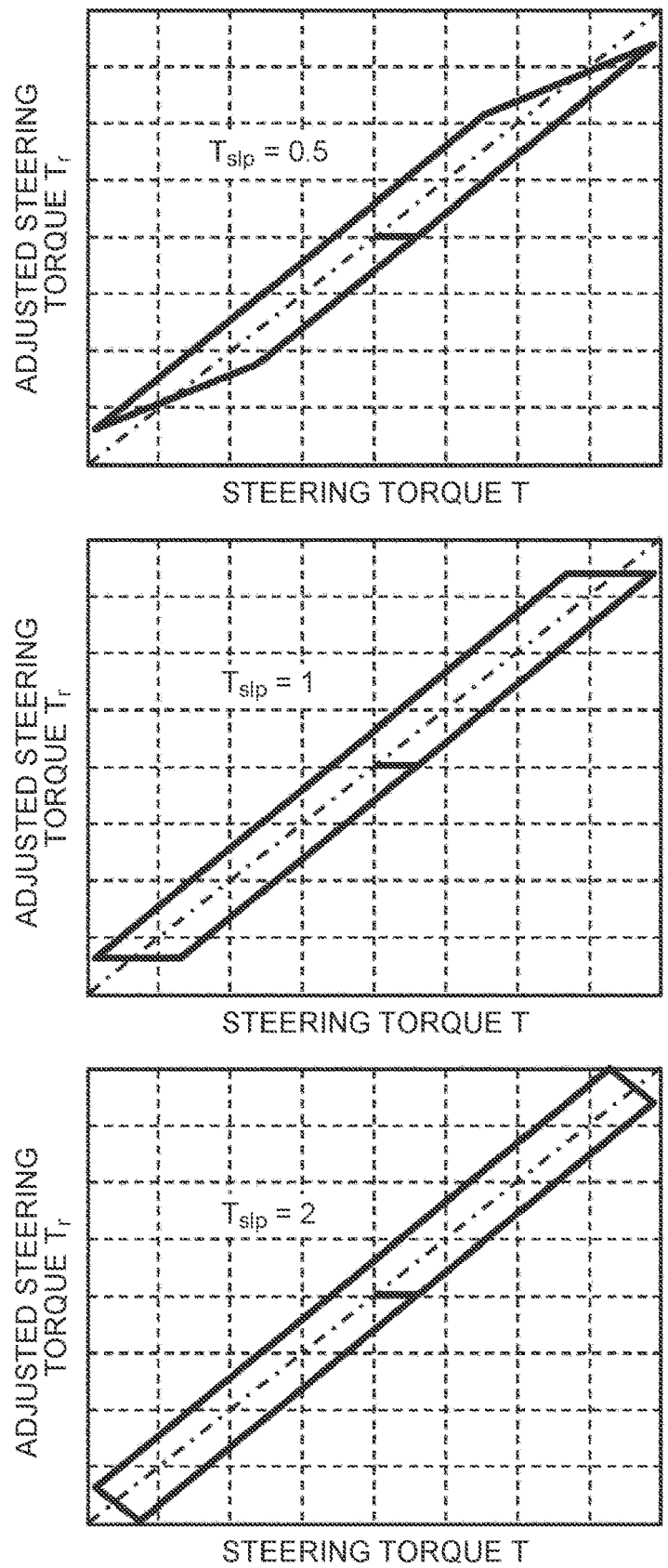
FIG. 13 is a graph showing an example of an adjusted steering torque that is calculated in an adjusted steering torque calculation processing unit according to a second modification example.

The adjusted steering torque calculation processing unit P210 may be configured to calculate the adjusted steering torque Tr such that the adjusted steering torque Tr changes with a predetermined gradient, when the adjusted steering torque deviation is equal to or smaller than the torque hysteresis Th. FIG. 13 shows an example of the adjusted steering torque Tr that is calculated in the adjusted steering torque calculation processing unit P210 according to the second modification example. FIG. 13 shows three examples in which a value Tslp that is defined in such a manner as to correspond to the predetermined gradient assumes different values respectively. The same as in the example shown in FIG. 4 holds true when Tslp=1. That is, in this case, the adjusted steering torque Tr remains equal to a certain value (the gradient is 0) when the adjusted steering torque deviation is equal to or smaller than the torque hysteresis Th. On the other hand, the characteristics in steering the vehicle reversely is different from that in the example shown in FIG. 4 when Tslp=0.5 or when Tslp=2.

As described hitherto, the characteristics in steering the vehicle reversely can be provided with a degree of freedom, by adopting the second modification example. The controllability of the vehicle can hence be optimally enhanced by appropriately setting the predetermined gradient.

Figure 14:
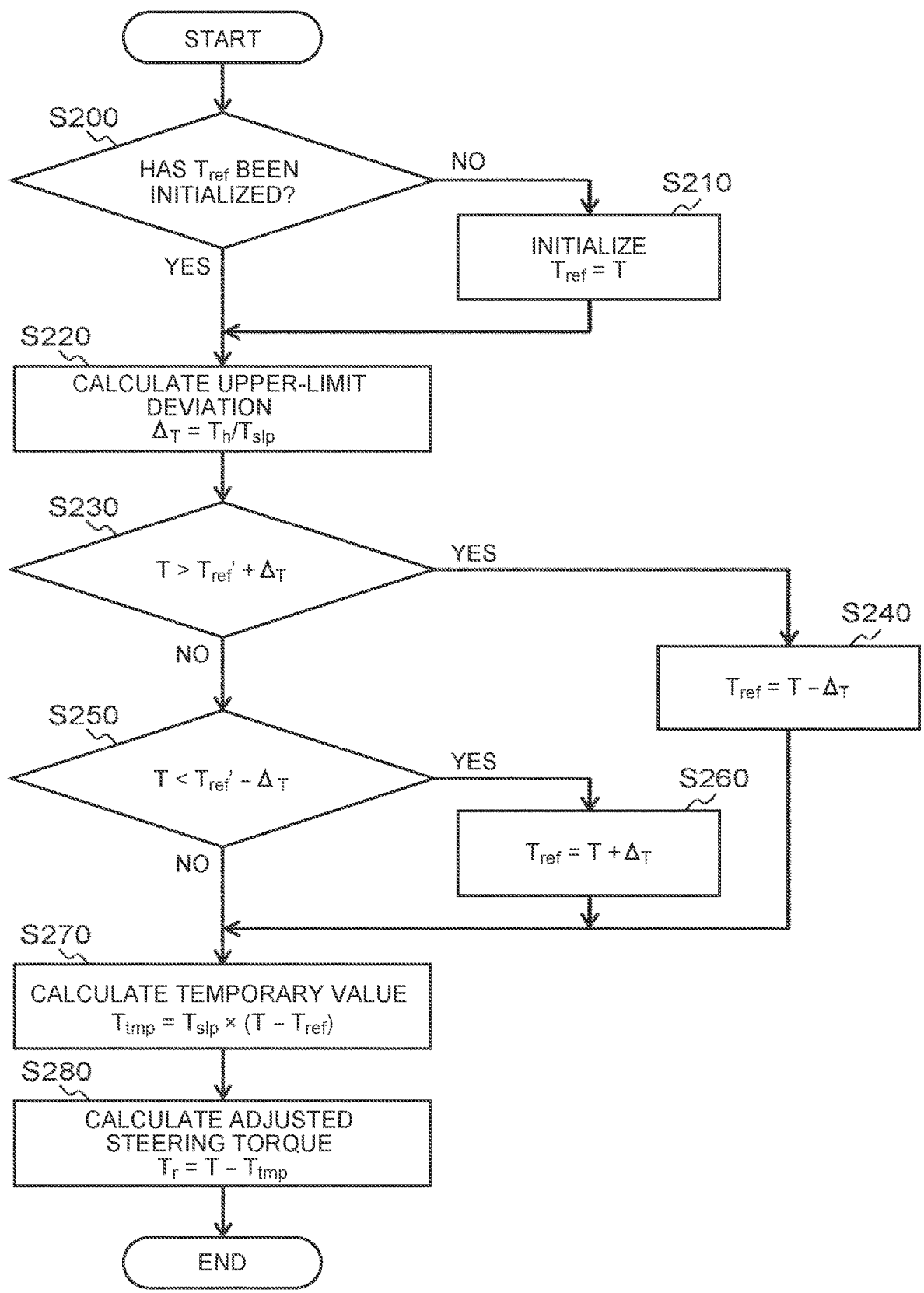
FIG. 14 is a flowchart showing an example of a processing routine in the adjusted steering torque calculation processing unit according to the second modification example.

It should be noted herein that the second modification example can be realized by executing the processing routine in the adjusted steering torque calculation processing unit P210 as follows. FIG. 14 is a flowchart showing an example of the processing routine in the adjusted steering torque calculation processing unit P210 according to the second modification example. The processing routine shown in FIG. 14 may be executed on a predetermined processing cycle.

In step S200, it is determined whether or not the reference torque Tref has been initialized. It should be noted herein that the reference torque Tref is calculated in such a manner as to have predetermined hysteresis characteristics with respect to changes in the steering torque T as is the case with the adjusted steering torque Tr, as will be apparent from processes that will be described below. It should be noted, however, that the hysteresis width follows an upper-limit deviation ΔT that will be described below. Besides, in particular, the reference torque Tref is equal to the adjusted steering torque Tr calculated in the processing routine shown in FIG. 10, when the adjusted steering torque deviation is larger than the torque hysteresis Th.

If the reference torque Tref has not been initialized (No in step S200), the current value of the steering torque T is adopted as the reference torque Tref (step S210). If the reference torque Tref has been initialized (Yes in step S200), the process proceeds to step S220.

In step S220, the upper-limit deviation ΔT is calculated. It should be noted herein that the upper-limit deviation ΔT is calculated by dividing the torque hysteresis Th by Tslp. By calculating the upper-limit deviation ΔT in this manner, Tslp becomes a value corresponding to the predetermined gradient, through the processing routine shown in FIG. 14 that will be described below. Incidentally, Tslp may be, for example, a value given in advance as the data 113. In particular, Tslp may be favorably determined in accordance with the environment to which the control apparatus according to the second modification example is applied.

After step S220, the process proceeds to step S230.

In step S230, it is determined whether or not the steering torque T is larger than the sum of the reference torque Tref in the last process and the upper-limit deviation ΔT.

If the steering torque T is larger than the sum of the reference torque Tref in the last process and the upper-limit deviation ΔT (Yes in step S230), a value obtained by subtracting the upper-limit deviation ΔT from the steering torque T is adopted as the reference torque Tref in the current process (step S240), and the process proceeds to step S270. If the steering torque T is not larger than the sum of the reference torque Tref in the last process and the upper-limit deviation ΔT (No in step S230), the process proceeds to step S250.

In step S250, it is determined whether or not the steering torque T is smaller than the difference between the reference torque Tref in the last process and the upper-limit deviation ΔT.

If the steering torque T is smaller than the difference between the reference torque Tref in the last process and the upper-limit deviation ΔT (Yes in step S250), a value obtained by adding the upper-limit deviation ΔT to the steering torque T is adopted as the reference torque Tref in the current process (step S260), and the process proceeds to step S270. If the steering torque T is not smaller than the difference between the reference torque Tref in the last process and the upper-limit deviation ΔT (No in step S250), the process proceeds to step S270 without computing the reference torque Tref That is, in this case, the reference torque Tref in the current process is equal to the reference torque Tref in the last process.

In step S270, a temporary value Ttmp is calculated. It should be noted herein that the temporary value Ttmp is calculated by multiplying a value obtained by subtracting the reference torque Tref from the steering torque T by Tslp.

After step S270, the process proceeds to step S280.

In step S280, a value obtained by subtracting the temporary value Ttmp calculated in step S270 from the steering torque T is calculated as the adjusted steering torque Tr in the current process, and the current process is ended.

By executing this routine, the adjusted steering torque Tr having the predetermined hysteresis characteristics with respect to changes in the steering torque T as shown in FIG. 13 can be calculated in the adjusted command torque calculation processing unit P300. In particular, the characteristics in steering the vehicle reversely can be changed in accordance with the value Tslp.

Figure 15:
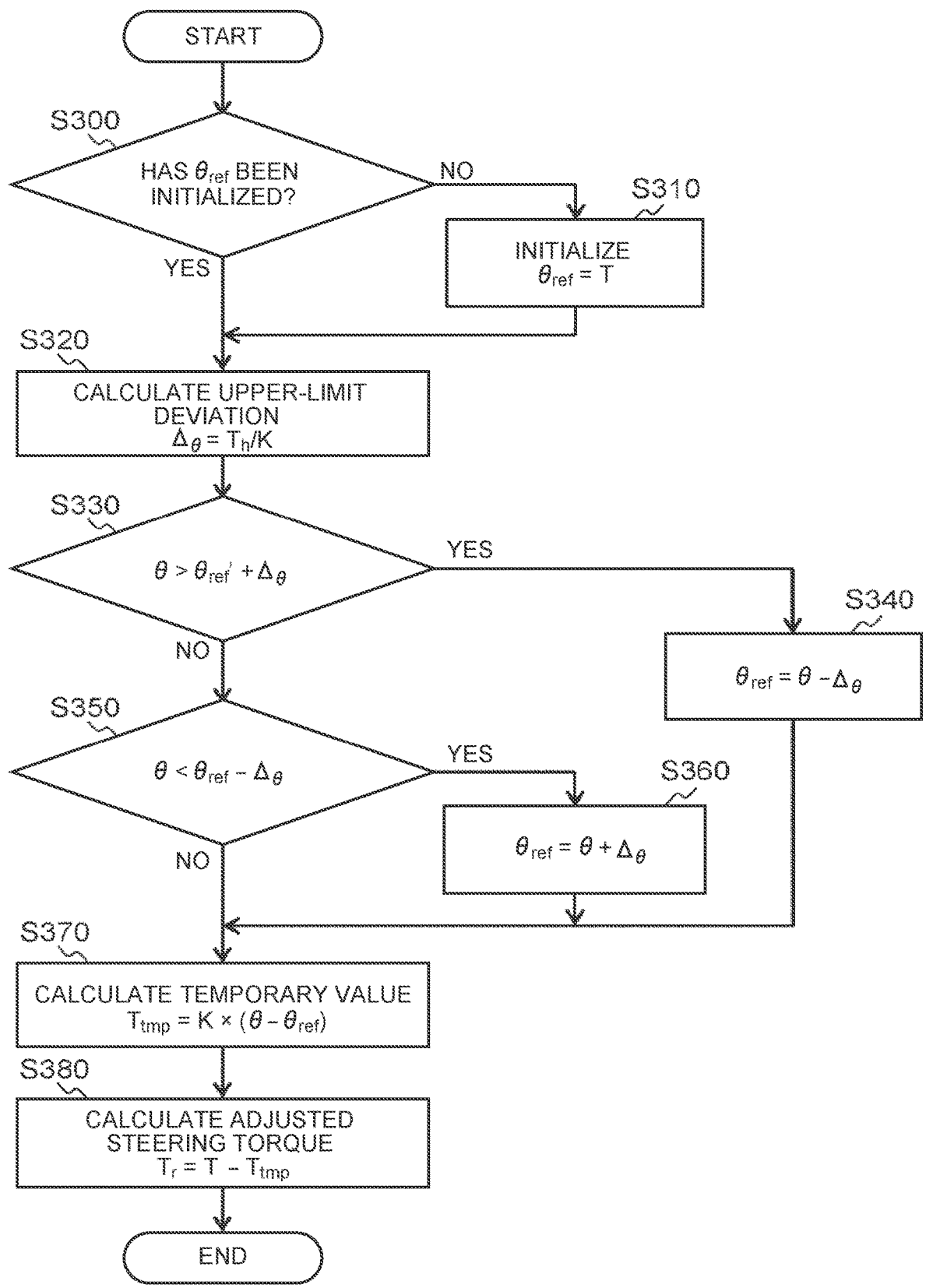
FIG. 15 is a flowchart showing another example of the processing routine in the adjusted steering torque calculation processing unit according to the second modification example.

Incidentally, the second modification example can also be realized by executing the processing routine in the adjusted steering torque calculation processing unit P210 as follows, focusing attention on the steering angle θ. FIG. 15 is a flowchart showing another example of the processing routine in the adjusted steering torque calculation processing unit P210 according to the second modification example. The processing routine shown in FIG. 15 may be executed on a predetermined processing cycle.

In step S300, it is determined whether or not the reference steering angle θref has been initialized. It should be noted herein that the reference steering angle θref is calculated in such a manner as to have predetermined hysteresis characteristics with respect to changes in the steering angle θ as will be apparent from a process that will be described below. In particular, the hysteresis width follows an upper-limit deviation Δθ that will be described below.

If the reference steering angle θref has not been initialized (No in step S300), the current value of the steering angle θ is adopted as the reference steering angle θref (step S310). If the reference steering angle θref has been initialized (Yes in step S300), the process proceeds to step S320.

In step S320, the upper-limit deviation Δθ is calculated. It should be noted herein that the upper-limit deviation Δθ is calculated by dividing the torque hysteresis Th by a predetermined value K. By calculating the upper-limit deviation Δθ in this manner, K assumes a value corresponding to a predetermined gradient, through the processing routine shown in FIG. 15 that will be described below. Besides, K can also be considered to prescribe "the rigidity" of the reference steering angle θref with respect to changes in the steering angle θ. Incidentally, K may be, for example, a value given in advance as the data 113. In particular, K may be favorably determined in accordance with the environment to which the control apparatus according to the second modification example is applied.

After step S320, the process proceeds to step S330.

In step S330, it is determined whether or not the steering angle θ is larger than the sum of the reference steering angle θref in the last process and the upper-limit deviation Δθ.

If the steering angle θ is larger than the sum of the reference steering angle θref in the last process and the upper-limit deviation Δθ (Yes in step S330), a value obtained by subtracting the upper-limit deviation Δθ from the steering angle θ is adopted as the reference steering angle θref in the current process (step S340), and the process proceeds to step S370. If the steering angle θ is not larger than the sum of the reference steering angle θref in the last process and the upper-limit deviation Δθ (No in step S330), the process proceeds to step S350.

In step S350, it is determined whether or not the steering angle θ is smaller than the difference between the reference steering angle θref in the last process and the upper-limit deviation Δθ.

If the steering angle θ is smaller than the difference between the reference steering angle θref in the last process and the upper-limit deviation Δθ (Yes in step S350), a value obtained by adding the upper-limit deviation Δθ to the steering angle θ is adopted as the reference steering angle θref in the current process (step S360), and the process proceeds to step S370. If the steering angle θ is not smaller than the difference between the reference steering angle θref in the last process and the upper-limit deviation Δθ (No in step S350), the process proceeds to step S370 without computing the reference steering angle θref. That is, in this case, the reference steering angle θref in the last process is adopted as the reference steering angle θref in the current process.

The temporary value Ttmp is calculated in step S370. It should be noted herein that the temporary value Ttmp is calculated by multiplying a value obtained by subtracting the reference steering angle θref from the steering angle θ by K.

After step S370, the process proceeds to step S380.

In step S380, a value obtained by subtracting the temporary value Ttmp calculated in step S370 from the steering torque T is calculated as the adjusted steering torque Tr in the current process, and the current process is ended.

By executing this processing routine as well, the adjusted steering torque Tr having the predetermined hysteresis characteristics with respect to changes in the steering torque T as shown in FIG. 13 can be calculated in the adjusted command torque calculation processing unit P300. It should be noted, however, that the characteristics in steering the vehicle reversely changes in accordance with the value K.

What is claimed is:

1. A control apparatus for a vehicle, the control apparatus being configured to perform:
    a process of calculating a command torque that is given to a steering mechanism to cause the vehicle to follow a target trajectory;
    an adjustment gain calculation process in which an adjustment gain for the command torque is calculated based on a steering torque;
    an adjusted command torque calculation process in which an adjusted command torque obtained by applying the adjustment gain to the command torque is calculated; and
    a process of controlling the steering mechanism in accordance with the adjusted command torque, wherein
    the adjustment gain calculation process includes
    a first process in which an adjusted steering torque having predetermined hysteresis characteristics with respect to changes in the steering torque is calculated based on the steering torque, and
    a second process in which the adjusted steering torque is converted into the adjustment gain.

2. The control apparatus according to claim 1, wherein the first process includes:
    calculating the adjusted steering torque in a current process in such a direction that an absolute value of a difference between the steering torque and the adjusted steering torque in a last process decreases, on condition that the absolute value be larger than a predetermined torque hysteresis; and
    calculating the adjusted steering torque in the last process as the adjusted steering torque in the current process, on condition that the absolute value be equal to or smaller than the torque hysteresis.

3. The control apparatus according to claim 2, wherein calculating the adjusted steering torque in the current process in such a direction that the absolute value decreases in the first process includes:
    calculating a value obtained by subtracting the torque hysteresis from the steering torque as the adjusted steering torque in the current process, when the steering torque is larger than the adjusted steering torque in the last process; and
    calculating a value obtained by adding the torque hysteresis to the steering torque as the adjusted steering torque in the current process, when the steering torque is smaller than the adjusted steering torque in the last process.

4. The control apparatus according to claim 1, wherein the first process includes:
    calculating the adjusted steering torque in a current process in such a direction that an absolute value of a difference between the steering torque and the steering torque in a last process decreases, when the absolute value is larger than a predetermined torque hysteresis; and
    calculating the adjusted steering torque in the current process such that adjusted steering torque in the current process changes with a predetermined gradient, when the absolute value is equal to or smaller than the torque hysteresis.

5. The control apparatus according to claim 2, wherein the adjustment gain calculation process further includes changing the torque hysteresis in accordance with the steering torque.

6. The control apparatus according to claim 1, wherein:
    the command torque includes an FF command torque that is a feedforward control amount based on a target state quantity that is designed to cause the vehicle to follow the target trajectory, and an FB command torque that is a feedback control amount based on a difference between the target state quantity and a current state quantity;
    the adjustment gain includes a first adjustment gain and a second adjustment gain;
    the adjustment gain calculation process includes the first process corresponding to the first adjustment gain or the second process corresponding to the second adjustment gain; and
    the adjusted command torque calculation process consists in calculating an adjusted FB command torque obtained by applying the first adjustment gain to the FB command torque, and calculating a value obtained by applying the second adjustment gain to a sum of the FF command torque and the adjusted FB command torque, or a sum of a value obtained by applying the second adjustment gain to the FF command torque and the adjusted FB command torque, as the adjusted command torque.

7. A steering device of a vehicle, the steering device comprising:
    the control apparatus according to claim 1; and
    a steering mechanism that is controlled by the control apparatus, wherein the steering mechanism is an electric power steering.

8. A control method for a vehicle, the control method comprising:
    calculating a command torque that is given to a steering mechanism to cause the vehicle to follow a target trajectory;
    calculating an adjustment gain for the command torque based on a steering torque;
    calculating an adjusted command torque obtained by applying the adjustment gain to the command torque; and
    controlling the steering mechanism in accordance with the adjusted command torque, wherein calculating the adjustment gain includes calculating an adjusted steering torque having predetermined hysteresis characteristics with respect to changes in the steering torque, based on the steering torque, and converting the adjusted steering torque into the adjustment gain.

* * * * *